United States Patent
Lin et al.

(10) Patent No.: US 10,073,248 B2
(45) Date of Patent: Sep. 11, 2018

(54) IMAGING LENS SYSTEM, IMAGE CAPTURING APPARATUS AND ELECTRONIC DEVICE

(71) Applicant: LARGAN PRECISION CO., LTD., Taichung (TW)

(72) Inventors: Cheng-Chen Lin, Taichung (TW); Chun-Che Hsueh, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 248 days.

(21) Appl. No.: 15/078,030

(22) Filed: Mar. 23, 2016

(65) Prior Publication Data

US 2017/0212332 A1  Jul. 27, 2017

(30) Foreign Application Priority Data

Jan. 21, 2016 (TW) .............................. 105101894 A

(51) Int. Cl.
| | | |
|---|---|---|
| *G02B 13/18* | (2006.01) | |
| *G02B 13/00* | (2006.01) | |
| *G02B 9/62* | (2006.01) | |
| *G02B 13/06* | (2006.01) | |

(52) U.S. Cl.
CPC ........... *G02B 13/0045* (2013.01); *G02B 9/62* (2013.01); *G02B 13/06* (2013.01)

(58) Field of Classification Search
CPC ...... G02B 3/04; G02B 13/0045; G02B 13/06; G02B 13/002; G02B 9/16; G02B 9/62
USPC ....... 359/713, 658, 761, 762, 752, 708, 733, 359/740, 745, 754
See application file for complete search history.

(56) References Cited

U.S. PATENT DOCUMENTS

2011/0157724 A1* 6/2011 Baba .................. G02B 13/0045
359/740

FOREIGN PATENT DOCUMENTS

| JP | 2013-054295 A | 3/2013 | |
|---|---|---|---|
| JP | 2014-010399 A | 1/2014 | |
| JP | 2014-010400 A | 1/2014 | |
| JP | 2014-010401 A | 1/2014 | |
| JP | WO2014192567 | * 4/2014 | ......... G02B 13/0045 |
| JP | 2014-134563 A | 7/2014 | |
| WO | 2014192567 A1 | 12/2014 | |

* cited by examiner

*Primary Examiner* — Stephone B Allen
*Assistant Examiner* — Travis Fissel
(74) *Attorney, Agent, or Firm* — McClure, Qualey & Rodack, LLP

(57) ABSTRACT

An imaging lens system includes, in order from an object side to an image side, a first lens element, a second lens element, a third lens element, a fourth lens element, a fifth lens element and a sixth lens element. The first lens element has negative refractive power. The fourth lens element with positive refractive power has an object-side surface and an image-side surface being both aspheric. The fifth lens element with negative refractive power has an object-side surface being concave in a paraxial region thereof and an image-side surface being convex in a paraxial region thereof, wherein two surfaces of the fifth lens element are aspheric. The sixth lens element has an image-side surface being concave in a paraxial region thereof and comprising at least one convex shape in an off-axial region thereof, wherein two surfaces of the sixth lens element are aspheric.

21 Claims, 19 Drawing Sheets

IMAGING LENS SYSTEM, IMAGE CAPTURING APPARATUS AND ELECTRONIC DEVICE

RELATED APPLICATIONS

This application claims priority to Taiwan Application Serial Number 105101894, filed Jan. 21, 2016, which is herein incorporated by reference.

BACKGROUND

Technical Field

The present disclosure relates to an imaging lens system and an image capturing device. More particularly, the present disclosure relates to an imaging lens system and an image capturing device with a compact size and a wide field of view applicable to electronic devices.

Description of Related Art

In recent years, with the development of compact electronic devices, corresponding image capturing devices installed are also required to be miniaturized. However, although conventional image capturing systems can be miniaturized, it is difficult to satisfy both demands of a large field of view and a short total track length. Thus, they cannot be applied to compact electronic devices while having a larger field of view, such as mobile phones, portable devices, wearable image recorders, optical recognition devices or other electronic devices.

SUMMARY

According to one aspect of the present disclosure, an imaging lens system includes, in order from an object side to an image side, a first lens element, a second lens element, a third lens element, a fourth lens element, a fifth lens element, and a sixth lens element. The first lens element has negative refractive power. The fourth lens element with positive refractive power has an object-side surface and an image-side surface being both aspheric. The fifth lens element with negative refractive power has an object-side surface being concave in a paraxial region thereof and an image-side surface being convex in a paraxial region thereof, wherein the object-side surface and the image-side surface of the fifth lens element are aspheric. The sixth lens element has an image-side surface being concave in a paraxial region thereof and comprising at least one convex shape in an off-axial region thereof, wherein an object-side surface and the image-side surface of the sixth lens element are aspheric. The imaging lens system has a total of six lens elements. At least three of the six lens elements are made of plastic materials. There is an air space between every two lens elements of the first lens element, the second lens element, the third lens element, the fourth lens element, the fifth lens element and the sixth lens element that are adjacent to each other. When an axial distance between the first lens element and the second lens element is T12, an axial distance between the fifth lens element and the sixth lens element is T56, a focal length of the first lens element is f1, a focal length of the second lens element is f2, and a focal length of the fifth lens element is f5, the following conditions are satisfied:

$1.10 < T56/T12;$ $|f1/f2| < 2.0;$ and $|f5/f2| < 1.50.$

According to another aspect of the present disclosure, an image capturing device includes the imaging lens system of the aforementioned aspect and an image sensor, wherein the image sensor is disposed on an image surface of the imaging lens system.

According to yet another aspect of the present disclosure, an electronic device includes the image capturing device of the aforementioned aspect.

DETAILED DESCRIPTION

Figure 1:
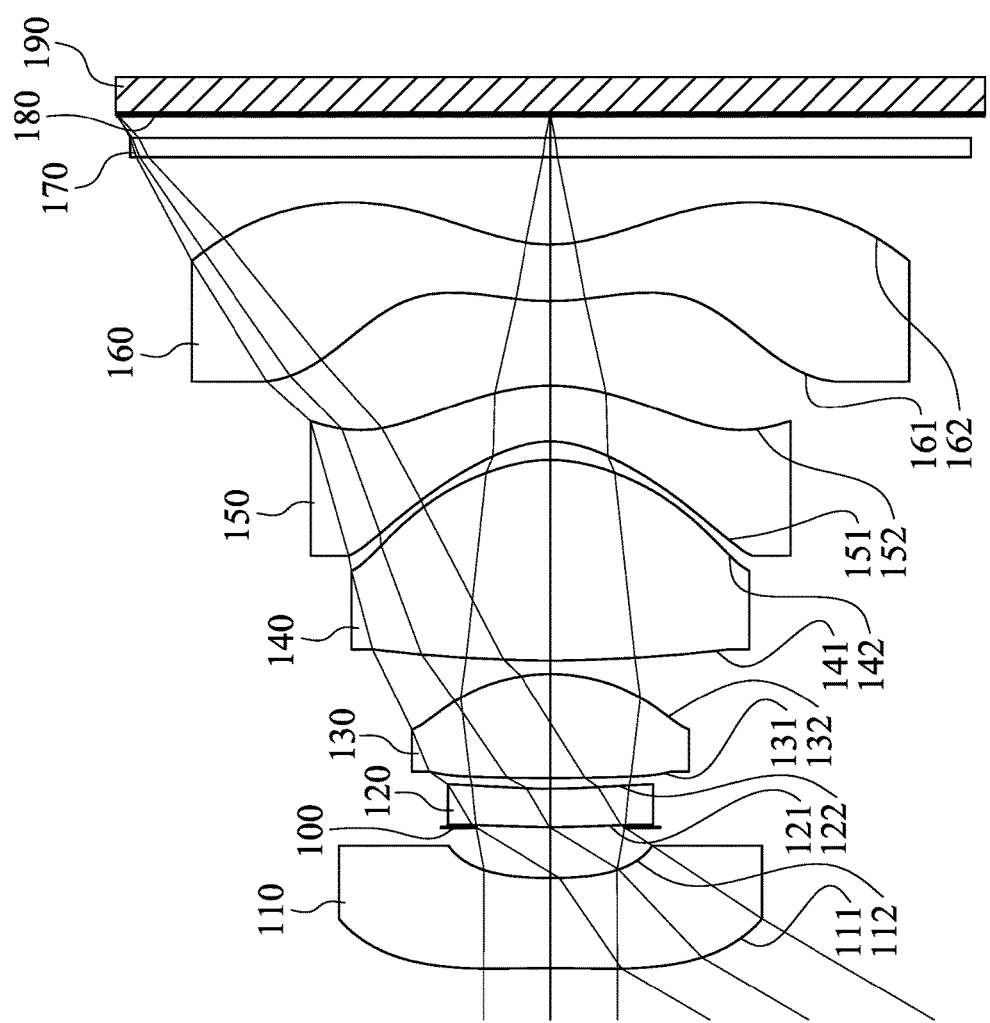
FIG. 1 is a schematic view of an image capturing device according to the 1st embodiment of the present disclosure.

An imaging lens system includes, in order from an object side to an image side, a first lens element, a second lens element, a third lens element, a fourth lens element, a fifth lens element and a sixth lens element, wherein the imaging lens system has a total of six lens elements, and at least three of the six lens elements are made of plastic materials.

According to the imaging lens system of the present disclosure, there is an air space between every two lens elements of the first lens element, the second lens element, the third lens element, the fourth lens element, the fifth lens element and the sixth lens element that are adjacent to each other. That is, each of the first through sixth lens elements is a single and non-cemented lens element, and every two lens elements adjacent to each other are not cemented, and there is a space between the two lens elements. Moreover, the manufacturing process of the cemented lenses is more complex than the non-cemented lenses. In other words, of the first lens element, the second lens element, the third lens element, the fourth lens element, the fifth lens element and the sixth lens element of the imaging lens system, there is a space in a paraxial region between every pair of lens elements that are adjacent to each other. In particular, a cementing surface of one lens element and a cementing surface of the following lens element need to have accurate curvature to ensure these two lens elements will be highly cemented. However, during the cementing process, those two lens elements might not be highly cemented due to displacements and it is thereby not favorable for image quality of the imaging lens system. Therefore, according to the imaging lens system of the present disclosure, having an air space in a paraxial region between every two of the first lens element, the second lens element, the third lens element, the fourth lens element, the fifth lens element and the sixth lens element that are adjacent to each other of the present disclosure avoids the problem generated by the cemented lens elements.

The first lens element with negative refractive power can have an object-side surface being concave in a paraxial region thereof and an image-side surface being concave in a paraxial region thereof, wherein the object-side surface of the first lens element can include at least one convex shape in an off-axial region thereof. Therefore, it is favorable for providing wider field of view so as to allow the incident light from larger field of view traveling into the imaging lens system.

The third lens element can have positive refractive power, so that aberrations generated from the first lens element can be corrected.

The fourth lens element has positive refractive power, so that the main positive refractive power can be provided by the fourth lens element for reducing the total track length of the imaging lens system.

The fifth lens element with negative refractive power has an object-side surface being concave in a paraxial region thereof and an image-side surface being convex in a paraxial region thereof, wherein the image-side surface of the fifth lens element can include at least one concave shape in an off-axial region thereof. Therefore, it is favorable for the incident light to converge on the image surface by the negative refractive power of the fifth lens element and the positive refractive power of the fourth lens element, so that the back focal length can be reduced so as to obtain the compact size of the imaging lens system.

The sixth lens element can have negative refractive power and an object-side surface being convex in a paraxial region thereof, and has an image-side surface being concave in a paraxial region thereof, wherein the image-side surface of the sixth lens element includes at least one convex shape in an off-axial region thereof. Therefore, the principal point can be positioned away from the image surface so as to reduce the back focal length for keeping a compact size. Further, it is also favorable for reducing the incident angle of the off-axial field onto the image sensor so as to increase the responding efficiency of the image sensor.

When an axial distance between the first lens element and the second lens element is T12, and an axial distance between the fifth lens element and the sixth lens element is T56, the following condition is satisfied: 1.10<T56/T12. Therefore, it is favorable for obtaining the compact arrangement between the first lens element and the second lens element, or avoiding the need of an additional element due to the excessive distance between the first lens element and the second lens element, that is, the simplified assembling and the compact size of the imaging lens system can be obtained so as to provide the sufficient space to arrange shapes of the fifth lens element and the sixth lens element for correcting aberrations. Preferably, the following condition can be satisfied: 1.25<T56/T12<4.0. More preferably, the following condition can be satisfied: 1.40<T56/T12<3.0.

When a focal length of the first lens element is f1, and a focal length of the second lens element is f2, the following condition is satisfied: |f1/f2|<2.0. Therefore, it is favorable for moderating the refractive angle of the incident light into the imaging lens system, so that the undesirable light can be avoided due to the surface reflection generated by the excessive refraction of the incident light. Preferably, the following condition can be satisfied: |f1/f2|<1.0. More preferably, the following condition can be satisfied: |f1/f2|<0.50.

When the focal length of the second lens element is f2, and a focal length of the fifth lens element is f5, the following condition is satisfied: |f5/f2|<1.50. Therefore, by properly adjusting the arrangement of the refractive power of the second lens element and the fifth lens element, it is favorable for avoiding over correcting aberrations of the lens elements closer to the image side due to the excessive refractive power of the second lens element. Preferably, the following condition can be satisfied: |f5/f2|<1.0. More preferably, the following condition can be satisfied: |f5/f2|<0.50.

The imaging lens system can further include an aperture stop disposed between the first lens element and the third lens element. When an f-number of the imaging lens system is Fno, the following condition is satisfied: 1.6<Fno≤2.65. Therefore, it is favorable for balancing the image brightness on the image surface and the depth of field so as to ensure the sufficient brightness and the satisfactory image quality.

When the focal length of the first lens element is f1, the focal length of the second lens element is f2, a focal length of the third lens element is f3, a focal length of the fourth lens element is f4, the focal length of the fifth lens element is f5, a focal length of the sixth lens element is f6, and |f4| can be a minimum value among values of |f1|, |f2|, |f3|, |f4|, |f5| and |f6|. Therefore, the lens element being the main source of positive refractive power of the imaging lens system can be arranged closer to the image surface, so that the sensitivity of the lens elements with the positive refractive power can be reduced.

When a focal length of the imaging lens system is f, the focal length of the third lens element is f3, and the focal length of the fourth lens element is f4, the following condition is satisfied: 1.5<|f/f3|+|f/f4|<3.0. Therefore, the positive refractive power of the imaging lens system can be well distributed in the third lens element and the fourth lens element, so that it is favorable for reducing the sensitivity problems so as to increase the manufacturing yield rate.

When a central thickness of the fifth lens element is CT5, a central thickness of the sixth lens element is CT6, and the axial distance between the fifth lens element and the sixth lens element is T56, the following condition is satisfied: 0.85<T56/(CT5+CT6)<2.0. Therefore, it is favorable for enhancing the image quality by proper arrangements of the fifth lens element and the sixth lens element.

When the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and the axial distance between the fifth lens element and the sixth lens element is T56, the following condition is satisfied: 2.5<(T12+T56)/(T23+T34+T45)<25. Therefore, the lens elements can be tightly arranged, so that the sensitivities of manufacturing tolerance and temperature effect can be reduced.

When an Abbe number of the first lens element is V1, an Abbe number of the second lens element is V2, an Abbe number of the third lens element is V3, an Abbe number of the fourth lens element is V4, an Abbe number of the fifth lens element is V5, and an Abbe number of the sixth lens element is V6, the following condition is satisfied: 1.90<(V1+V3+V4)/(V2+V5+V6)<3.5. Therefore, the chromatic aberration among various aberrations can be balanced.

When a central thickness of the first lens element is CT1, and a central thickness of the third lens element is CT3, the following condition is satisfied: 0.70<CT1/CT3<1.5. Therefore, it is favorable for avoiding problems in lens molding or assembling due to improper thickness of the first lens element, as well as insufficient structure strength of the first lens element.

When the central thickness of the first lens element is CT1, and a central thickness of the second lens element is CT2, the following condition is satisfied: 0.10<CT2/CT1<0.70. Therefore, it is favorable for correcting aberrations generated from the first lens element and reducing the sensitivity thereof.

When the focal length of the imaging lens system is f, a curvature radius of an object-side surface of the second lens element is R3, and a curvature radius of an image-side surface of the second lens element is R4, the following condition is satisfied: |f/R3|+|f/R4|<1.0. Therefore, it is favorable for avoiding molding problems by reducing the surface shape variation of the second lens element.

When the focal length of the imaging lens system is f, and a maximal effective radius of the image-side surface of the sixth lens element is Y62, the following condition is satisfied: 0.90<Y62/f<1.30. Therefore, it is favorable for enlarging the field of view and reducing the back focal length so as to obtain the compact size of the imaging lens system.

According to the imaging lens system of the present disclosure, the lens elements thereof can be made of glass or plastic materials. When the lens elements are made of glass materials, the distribution of the refractive power of the imaging lens system may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the imaging lens system. Therefore, the total track length of the imaging lens system can also be reduced.

According to the imaging lens system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly, when the lens element has a convex surface, it indicates that the surface can be convex in the paraxial region thereof; when the lens element has a concave surface, it indicates that the surface can be concave in the paraxial region thereof.

According to the imaging lens system of the present disclosure, the refractive power or the focal length of a lens element being positive or negative may refer to the refractive power or the focal length in a paraxial region of the lens element.

According to the imaging lens system of the present disclosure, the imaging lens system can include at least one stop, such as an aperture stop, a glare stop or a field stop. Said glare stop or said field stop is for eliminating the stray light and thereby improving the image resolution thereof.

According to the imaging lens system of the present disclosure, the image surface of the imaging lens system, based on the corresponding image sensor, can be flat or curved. In particular, the image surface can be a curved surface being concave facing towards the object side.

According to the imaging lens system of the present disclosure, an aperture stop can be configured as a middle stop. A middle stop disposed between the first lens element and the image surface is favorable for enlarging the field of view of the imaging lens system and thereby provides a wider field of view for the same.

According to the imaging lens system of the present disclosure, the image capturing optical lens assembly can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing device is provided. The image capturing device includes the aforementioned imaging lens system and an image sensor, wherein the image sensor is disposed on the image side of the aforementioned imaging lens system, that is, the image sensor can be disposed on or near the image surface of the aforementioned imaging lens system. By the arrangement of the aforementioned imaging lens system, the first lens element with negative refractive power is proper for allowing the incident light with larger field of view into the imaging lens system, and the fourth lens element with positive refractive power and the fifth lens element with negative refractive power can converge the incident light onto the image surface so as to reduce the back focal length and obtain the compact size thereof. Therefore, the image capturing device can have both features of wide field of view and compact size for providing better ability of aberration controlling and sufficient relative illumination, and the proper arrangement of shape of the lens elements can be obtained easily. Preferably, the image capturing device can further include a barrel member, a holder member or a combination thereof.

According to the present disclosure, an electronic device is provided, which includes the aforementioned image capturing device. Therefore, image quality of the electronic device can be improved. Preferably, the electronic device can further include but not limited to a control unit, a display, a storage unit, a random access memory unit (RAM) or a combination thereof.

According to the above description of the present disclosure, the following 1 st-11 th specific embodiments are provided for further explanation.

1st Embodiment

Figure 2:
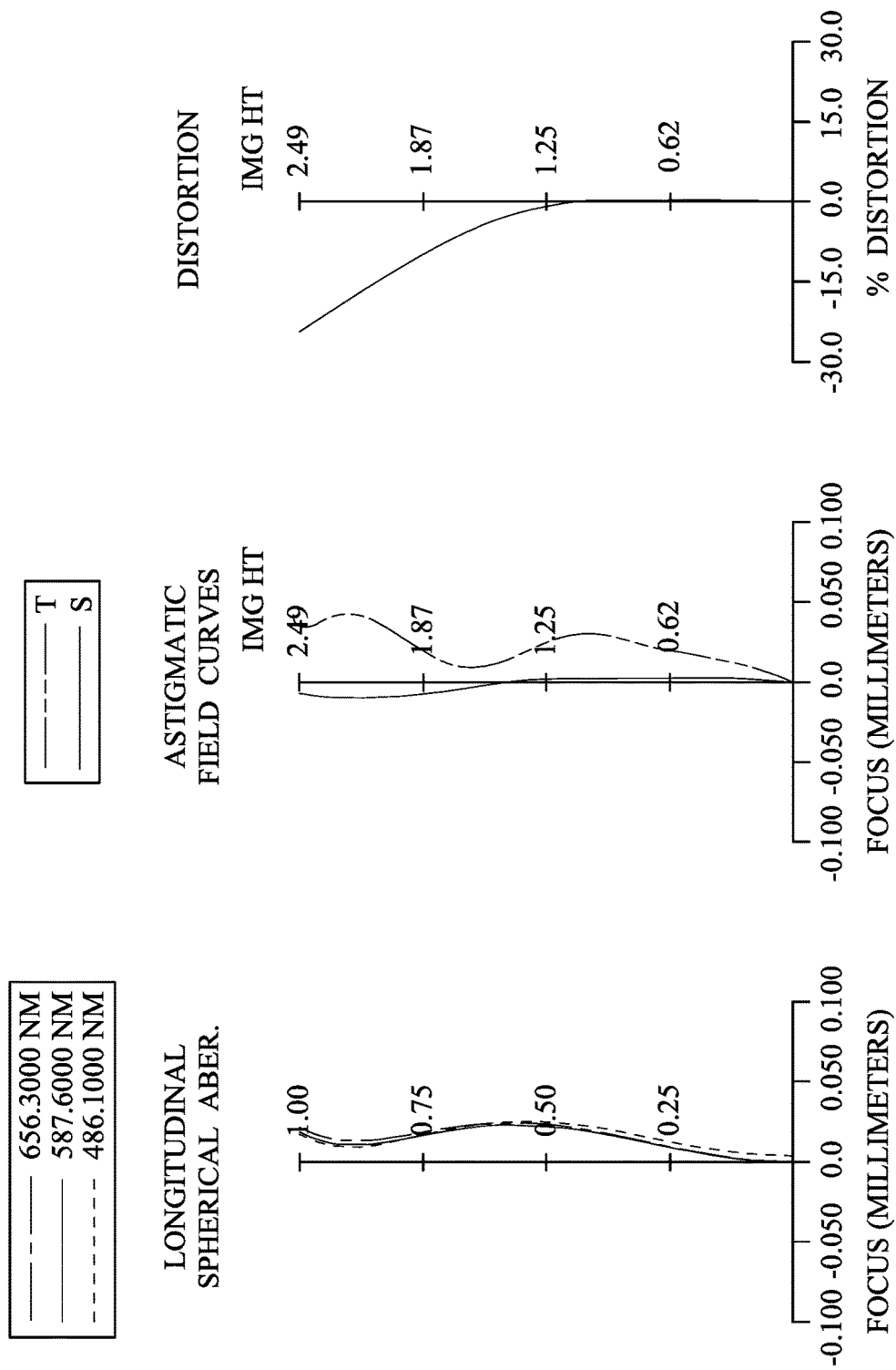
FIG. 2 shows spherical aberration curves, astigmatic field curves and a distortion curve of the image capturing device according to the 1st embodiment.

FIG. 1 is a schematic view of an image capturing device according to the 1st embodiment of the present disclosure. FIG. 2 shows spherical aberration curves, astigmatic field curves and a distortion curve of the image capturing device according to the 1st embodiment. In FIG. 1, the image capturing device includes an imaging lens system (its reference numeral is omitted) and an image sensor 190. The imaging lens system includes, in order from an object side to an image side, a first lens element 110, an aperture stop 100, a second lens element 120, a third lens element 130, a fourth lens element 140, a fifth lens element 150, a sixth lens element 160, an IR-cut filter 170 and an image surface 180, wherein the image sensor 190 is disposed on the image surface 180 of the imaging lens system. The imaging lens system has a total of six lens elements (110-160), and there is an air space between every two lens elements of the first lens element 110, the second lens element 120, the third lens element 130, the fourth lens element 140, the fifth lens element 150 and the sixth lens element 160 that are adjacent to each other.

The first lens element 110 with negative refractive power has an object-side surface 111 being concave in a paraxial region thereof and an image-side surface 112 being concave in a paraxial region thereof. The first lens element 110 is made of a plastic material, and has the object-side surface 111 and the image-side surface 112 being both aspheric. Furthermore, the object-side surface 111 of the first lens element 110 includes at least one convex shape in an off-axial region thereof.

The second lens element 120 with negative refractive power has an object-side surface 121 being convex and an image-side surface 122 being concave. The second lens element 120 is made of a plastic material, and has the object-side surface 121 and the image-side surface 122 being both aspheric.

The third lens element 130 with positive refractive power has an object-side surface 131 being convex and an image-side surface 132 being convex. The third lens element 130 is made of a plastic material, and has the object-side surface 131 and the image-side surface 132 being both aspheric.

The fourth lens element 140 with positive refractive power has an object-side surface 141 being convex and an image-side surface 142 being convex. The fourth lens element 140 is made of a plastic material, and has the object-side surface 141 and the image-side surface 142 being both aspheric.

The fifth lens element 150 with negative refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric. Furthermore, the image-side surface 152 of the fifth lens element 150 includes at least one concave shape in an off-axial region thereof.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex shape in an off-axial region thereof.

The IR-cut filter 170 is made of a glass material and located between the sixth lens element 160 and the image surface 180, and will not affect the focal length of the imaging lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the imaging lens system according to the 1st embodiment, when a focal length of the imaging lens system is f, an f-number of the imaging lens system is Fno, and half of a maximal field of view of the imaging lens system is HFOV, these parameters have the following values: f=1.94 mm; Fno=2.52; and HFOV=59.5 degrees.

In the imaging lens system according to the 1st embodiment, when an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, and an Abbe number of the sixth lens element 160 is V6, the following condition is satisfied: (V1+V3+V4)/(V2+V5+V6)=2.07.

In the imaging lens system according to the 1st embodiment, when a central thickness of the first lens element 110 is CT1, a central thickness of the second lens element 120 is CT2, and a central thickness of the third lens element 130 is CT3, the following conditions are satisfied: CT1/CT3=0.86; and CT2/CT1=0.43.

In the imaging lens system according to the 1st embodiment, when an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and an axial distance between the fifth lens element 150 and the sixth lens element 160 is T56, the following conditions are satisfied: (T12+T56)/(T23+T34+T45)=3.17; and T56/T12=1.66.

In the imaging lens system according to the 1st embodiment, when a central thickness of the fifth lens element 150 is CT5, a central thickness of the sixth lens element 160 is CT6, and the axial distance between the fifth lens element 150 and the sixth lens element 160 is T56, the following condition is satisfied: T56/(CT5+CT6)=0.75.

In the imaging lens system according to the 1st embodiment, when the focal length of the imaging lens system is f, and a maximal effective radius of the image-side surface 162 of the sixth lens element 160 is Y62, the following condition is satisfied: Y62/f=1.06.

In the imaging lens system according to the 1st embodiment, when the focal length of the imaging lens system is f, a curvature radius of the object-side surface 121 of the second lens element 120 is R3, and a curvature radius of the image-side surface 122 of the second lens element 120 is R4, the following condition is satisfied: |f/R3|+|f/R 4|=0.81.

In the imaging lens system according to the 1st embodiment, when a focal length of the first lens element 110 is f1, and a focal length of the second lens element 120 is f2, the following condition is satisfied: |f1/f2|=0.112.

In the imaging lens system according to the 1st embodiment, when the focal length of the second lens element 120 is f2, and a focal length of the fifth lens element 150 is f5, the following condition is satisfied: |f5/f2|=0.083.

In the imaging lens system according to the 1st embodiment, when the focal length of the imaging lens system is f, a focal length of the third lens element 130 is f3, and a focal length of the fourth lens element 140 is f4, the following condition is satisfied: |f/f3|+f/f4|=2.30.

In the imaging lens system according to the 1st embodiment, when the focal length of the first lens element 110 is f1, the focal length of the second lens element 120 is f2, the focal length of the third lens element 130 is f3, the focal length of the fourth lens element 140 is f4, the focal length of the fifth lens element 150 is f5, and a focal length of the sixth lens element 160 is f6, and |f4| is a minimum value among values of |f1|, |f2|, |f3|, |f4|, |f5| and |f6|.

The detailed optical data of the 1st embodiment are shown in Table 1 and the aspheric surface data are shown in Table 2 below.

TABLE 1

1st Embodiment
f = 1.94 mm, Fno = 2.52, HFOV = 59.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −8.810 | ASP | 0.515 | Plastic | 1.545 | 56.1 | −3.37 |
| 2 | | 2.365 | ASP | 0.290 | | | | |
| 3 | Ape. Stop | Plano | | 0.002 | | | | |
| 4 | Lens 2 | 5.493 | ASP | 0.220 | Plastic | 1.660 | 20.4 | −30.14 |
| 5 | | 4.236 | ASP | 0.061 | | | | |
| 6 | Lens 3 | 12.946 | ASP | 0.598 | Plastic | 1.545 | 56.1 | 1.89 |
| 7 | | −1.099 | ASP | 0.078 | | | | |
| 8 | Lens 4 | 5.884 | ASP | 1.149 | Plastic | 1.515 | 56.5 | 1.52 |
| 9 | | −0.840 | ASP | 0.106 | | | | |
| 10 | Lens 5 | −0.573 | ASP | 0.323 | Plastic | 1.660 | 20.4 | −2.49 |
| 11 | | −1.075 | ASP | 0.485 | | | | |
| 12 | Lens 6 | 1.600 | ASP | 0.323 | Plastic | 1.566 | 40.8 | −4.58 |
| 13 | | 0.917 | ASP | 0.500 | | | | |
| 14 | IR-cut filter | Plano | | 0.110 | Glass | 1.517 | 64.2 | — |
| 15 | | Plano | | 0.138 | | | | |
| 16 | Image | Plano | | — | | | | |

Reference wavelength is 587.6 nm (d-line).

TABLE 2

Aspheric Coefficients

| | Surface # | | | | | |
|---|---|---|---|---|---|---|
| | 1 | 2 | 4 | 5 | 6 | 7 |
| k = | 3.3804E+01 | −2.2722E+01 | −7.0644E+00 | −7.4832E+01 | −8.1432E+01 | 2.3592E−01 |
| A4 = | 2.7958E−01 | 9.1003E−01 | −6.6725E−02 | 4.6668E−02 | −4.6851E−02 | −1.5000E−01 |
| A6 = | −2.1382E−01 | −4.4353E−01 | −2.5785E−01 | −4.0863E−01 | 9.4677E−02 | 2.6366E−01 |
| A8 = | 1.6998E−01 | −1.0833E+00 | 7.4108E−02 | 3.8106E−01 | −4.9491E−02 | 1.0079E−01 |
| A10 = | −6.5117E−02 | 2.8382E+01 | −2.3914E+00 | 1.1567E+00 | 3.5332E+00 | −1.2285E+00 |
| A12 = | 4.3321E−03 | −1.0610E+02 | | −4.3886E+00 | −8.2930E+00 | 2.3185E+00 |
| A14 = | 4.9097E−03 | 1.6862E+02 | | | 5.7259E+00 | −1.4053E−01 |

| | Surface # | | | | | |
|---|---|---|---|---|---|---|
| | 8 | 9 | 10 | 11 | 12 | 13 |
| k = | −4.0051E+01 | −5.8657E−01 | −1.4711E+00 | −1.0231E+00 | −9.3519E−01 | −1.6656E+00 |
| A4 = | −1.1706E−01 | 6.1080E−01 | 8.3960E−01 | 3.9293E−01 | −5.5056E−01 | −4.2189E−01 |
| A6 = | 3.9849E−01 | −1.1939E+00 | −2.3184E+00 | −5.2390E−01 | 1.3525E−01 | 2.8876E−01 |
| A8 = | −6.7521E−01 | 1.4843E+00 | 3.7027E+00 | 6.1265E−01 | −3.4981E−02 | −1.3493E−01 |
| A10 = | 5.9259E−01 | −1.0799E+00 | −3.5617E+00 | −3.6848E−01 | 7.2593E−02 | 4.1717E−02 |
| A12 = | −2.0827E−01 | 4.3938E−01 | 1.9428E+00 | 1.1362E−01 | −4.2216E−02 | −8.1580E−03 |
| A14 = | 2.6059E−03 | −5.6513E−02 | −5.1791E−01 | −1.6958E−02 | 9.6131E−03 | 9.0889E−04 |
| A16 = | | | 4.7971E−02 | 9.1937E−04 | −7.8930E−04 | −4.3722E−05 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
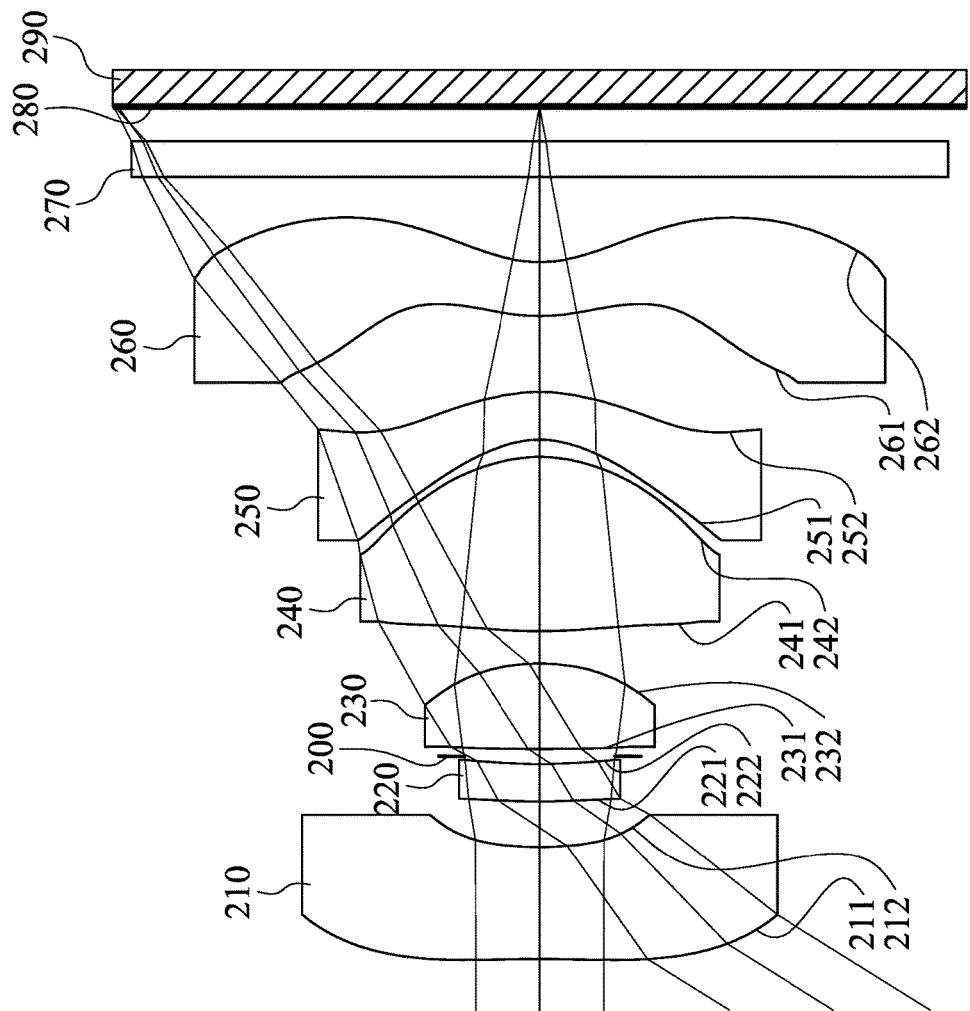
FIG. 3 is a schematic view of an image capturing device according to the 2nd embodiment of the present disclosure.
Figure 4:
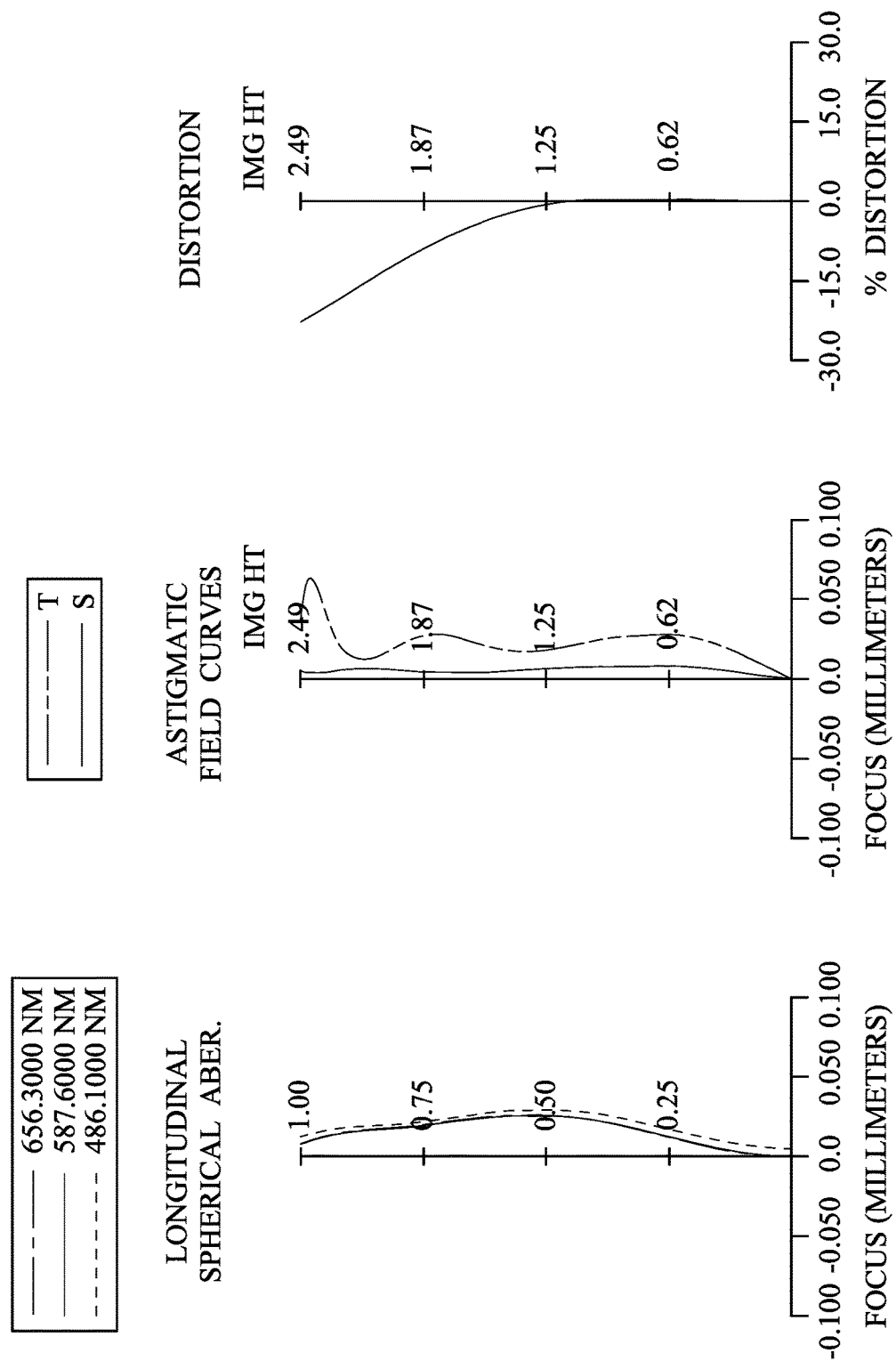
FIG. 4 shows spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows spherical aberration curves, astigmatic field curves and a distortion curve of the image capturing device according to the 2nd embodiment. In FIG. 3, the image capturing device includes an imaging lens system (its reference numeral is omitted) and an image sensor 290. The imaging lens system includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein the image sensor 290 is disposed on the image surface 280 of the imaging lens system. The imaging lens system has a total of six lens elements (210-260), and there is an air space between every two lens elements of the first lens element 210, the second lens element 220, the third lens element 230, the fourth lens element 240, the fifth lens element 250 and the sixth lens element 260 that are adjacent to each other.

The first lens element 210 with negative refractive power has an object-side surface 211 being concave in a paraxial region thereof and an image-side surface 212 being concave in a paraxial region thereof. The first lens element 210 is made of a plastic material, and has the object-side surface 211 and the image-side surface 212 being both aspheric. Furthermore, the object-side surface 211 of the first lens element 210 includes at least one convex shape in an off-axial region thereof.

The second lens element 220 with negative refractive power has an object-side surface 221 being convex and an image-side surface 222 being concave. The second lens element 220 is made of a plastic material, and has the object-side surface 221 and the image-side surface 222 being both aspheric.

The third lens element 230 with positive refractive power has an object-side surface 231 being convex and an image-side surface 232 being convex. The third lens element 230 is made of a plastic material, and has the object-side surface 231 and the image-side surface 232 being both aspheric.

The fourth lens element 240 with positive refractive power has an object-side surface 241 being convex and an image-side surface 242 being convex. The fourth lens element 240 is made of a plastic material, and has the object-side surface 241 and the image-side surface 242 being both aspheric.

The fifth lens element 250 with negative refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric. Furthermore, the image-side surface 252 of the fifth lens element 250 includes at least one concave shape in an off-axial region thereof.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axial region thereof.

The IR-cut filter 270 is made of a glass material and located between the sixth lens element 260 and the image surface 280, and will not affect the focal length of the imaging lens system.

The detailed optical data of the 2nd embodiment are shown in Table 3 and the aspheric surface data are shown in Table 4 below.

TABLE 3

2nd Embodiment
f = 2.00 mm, Fno = 2.65, HFOV = 58.1 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | −8.147 | ASP | 0.661 | Plastic | 1.544 | 56.0 | −3.29 |
| 2 |  | 2.363 | ASP | 0.268 |  |  |  |  |
| 3 | Lens 2 | 4.360 | ASP | 0.220 | Plastic | 1.660 | 20.4 | −47.02 |
| 4 |  | 3.746 | ASP | 0.046 |  |  |  |  |
| 5 | Ape. Stop | Plano |  | 0.043 |  |  |  |  |
| 6 | Lens 3 | 11.795 | ASP | 0.501 | Plastic | 1.535 | 55.8 | 2.29 |
| 7 |  | −1.349 | ASP | 0.191 |  |  |  |  |
| 8 | Lens 4 | 2.944 | ASP | 1.028 | Plastic | 1.515 | 56.5 | 1.44 |
| 9 |  | −0.871 | ASP | 0.101 |  |  |  |  |
| 10 | Lens 5 | −0.589 | ASP | 0.280 | Plastic | 1.660 | 20.4 | −2.33 |
| 11 |  | −1.136 | ASP | 0.447 |  |  |  |  |
| 12 | Lens 6 | 1.144 | ASP | 0.320 | Plastic | 1.544 | 56.0 | −5.97 |
| 13 |  | 0.763 | ASP | 0.500 |  |  |  |  |

TABLE 3-continued

2nd Embodiment
f = 2.00 mm, Fno = 2.65, HFOV = 58.1 deg.

| Surface # | | Curvature Radius | Thickness | Material | Index | Abbe # | Focal Length |
|---|---|---|---|---|---|---|---|
| 14 | IR-cut filter | Plano | 0.210 | Glass | 1.517 | 64.2 | — |
| 15 | | Plano | 0.216 | | | | |
| 16 | Image | Plano | — | | | | |

Reference wavelength is 587.6 nm (d-line).
Effective radius of surface 2 is 0.650 mm.
Effective radius of surface 8 is 0.950 mm.

TABLE 4

Aspheric Coefficients

| | Surface # | | | | | |
|---|---|---|---|---|---|---|
| | 1 | 2 | 3 | 4 | 6 | 7 |
| k = | 2.8218E+01 | −2.2722E+01 | −7.0644E+00 | −7.4832E+01 | −8.1432E+01 | 1.4757E+00 |
| A4 = | 1.9089E−01 | 7.8168E−01 | −3.5301E−02 | 1.7490E−01 | −8.5520E−02 | −3.6828E−01 |
| A6 = | −1.1728E−01 | −1.2397E+00 | −4.4748E−01 | −4.5047E−01 | 6.2579E−01 | 4.3016E−01 |
| A8 = | 7.8314E−02 | 9.2851E+00 | −2.5981E−01 | −1.7978E+00 | −5.5398E+00 | −2.4298E−01 |
| A10 = | −3.3187E−02 | −4.1249E+01 | −2.8863E+00 | 1.7464E+01 | 3.0866E+01 | −4.5643E−01 |
| A12 = | 8.3022E−03 | 1.0320E+02 | | −3.9514E+01 | −6.7689E+01 | 1.2199E+00 |
| A14 = | −6.9844E−04 | −1.0466E+02 | | | 5.3748E+01 | 2.4356E+00 |

| | Surface # | | | | | |
|---|---|---|---|---|---|---|
| | 8 | 9 | 10 | 11 | 12 | 13 |
| k = | −4.0051E+01 | −5.4855E−01 | −1.4353E+00 | −9.6885E−01 | −1.7358E+00 | −1.6957E+00 |
| A4 = | −1.2875E−01 | 7.5853E−01 | 1.0442E+00 | 3.4811E−01 | −7.2158E−01 | −5.4693E−01 |
| A6 = | 7.6883E−02 | −2.9715E+00 | −4.5569E+00 | −6.8802E−01 | 4.3579E−01 | 4.5970E−01 |
| A8 = | 1.0540E−01 | 6.6208E+00 | 1.1030E+01 | 1.1932E+00 | −4.9462E−01 | −2.6785E−01 |
| A10 = | −4.8941E−01 | −7.8811E+00 | −1.4591E+01 | −9.3139E−01 | 5.6350E−01 | 1.0582E−01 |
| A12 = | 7.5557E−01 | 4.6938E+00 | 1.0523E+01 | 3.2218E−01 | −3.2377E−01 | −2.6666E−02 |
| A14 = | −3.5646E−01 | −1.0551E+00 | −3.8935E+00 | −3.4165E−02 | 8.9925E−02 | 3.8329E−03 |
| A16 = | | | 5.8532E−01 | −2.9306E−03 | −9.9447E−03 | −2.3834E−04 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.00 | T56/T12 | 1.67 |
| Fno | 2.65 | T56/(CT5 + CT6) | 0.75 |
| HFOV [deg.] | 58.1 | Y62/f | 1.02 |
| (V1 + V3 + V4)/(V2 + V5 + V6) | 1.74 | |f/R3| + |f/R4| | 0.99 |
| CT1/CT3 | 1.32 | |f1/f2| | 0.070 |
| CT2/CT1 | 0.33 | |f5/f2| | 0.050 |
| (T12 + T56)/(T23 + T34 + T45) | 1.88 | |f/f3| + |f/f4| | 2.26 |

Moreover, in the imaging lens system according to the 2nd embodiment, when the focal length of the first lens element 210 is f1, the focal length of the second lens element 220 is f2, the focal length of the third lens element 230 is f3, the focal length of the fourth lens element 240 is f4, the focal length of the fifth lens element 250 is f5, and the focal length of the sixth lens element 260 is f6, and |f4| is a minimum value among values of |f1|, |f2|, |f3|, |f4|, |f5| and |f6|.

3rd Embodiment

Figure 5:
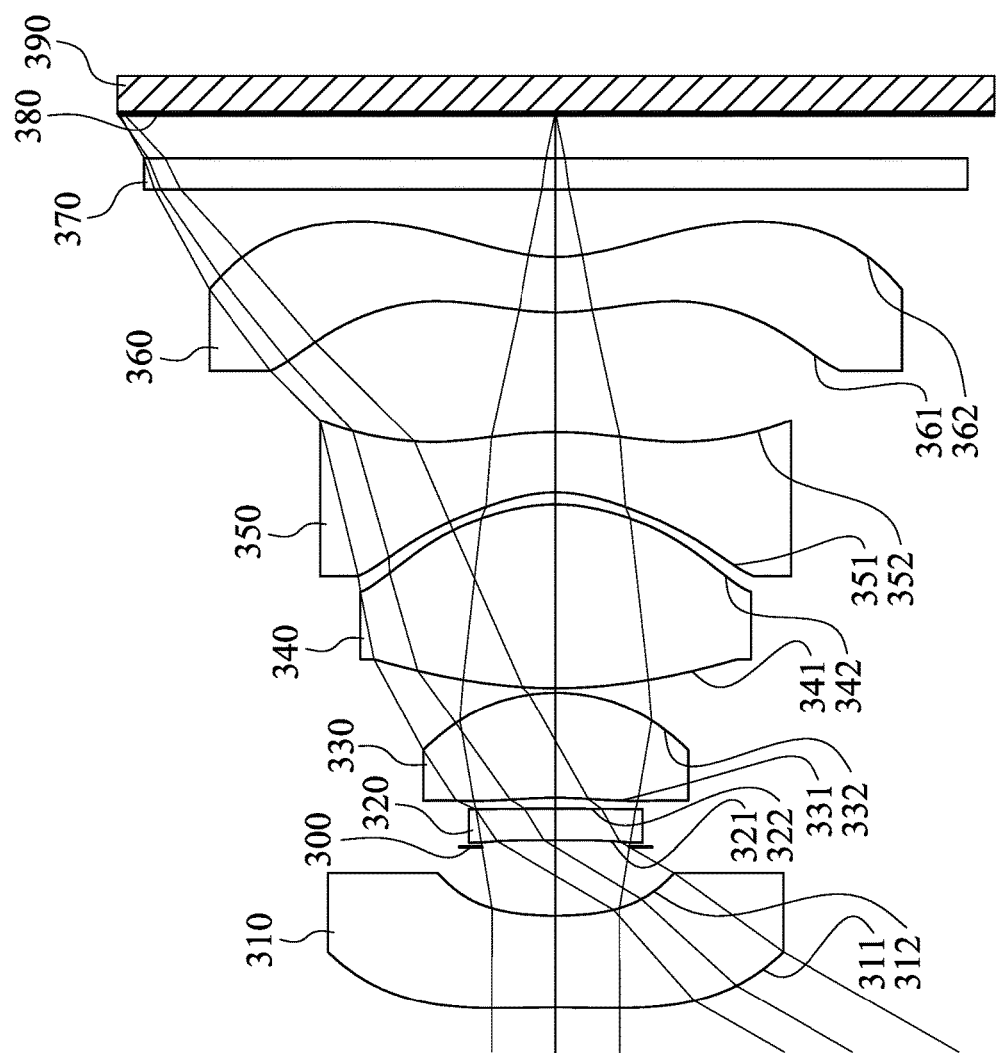
FIG. 5 is a schematic view of an image capturing device according to the 3rd embodiment of the present disclosure.
Figure 6:
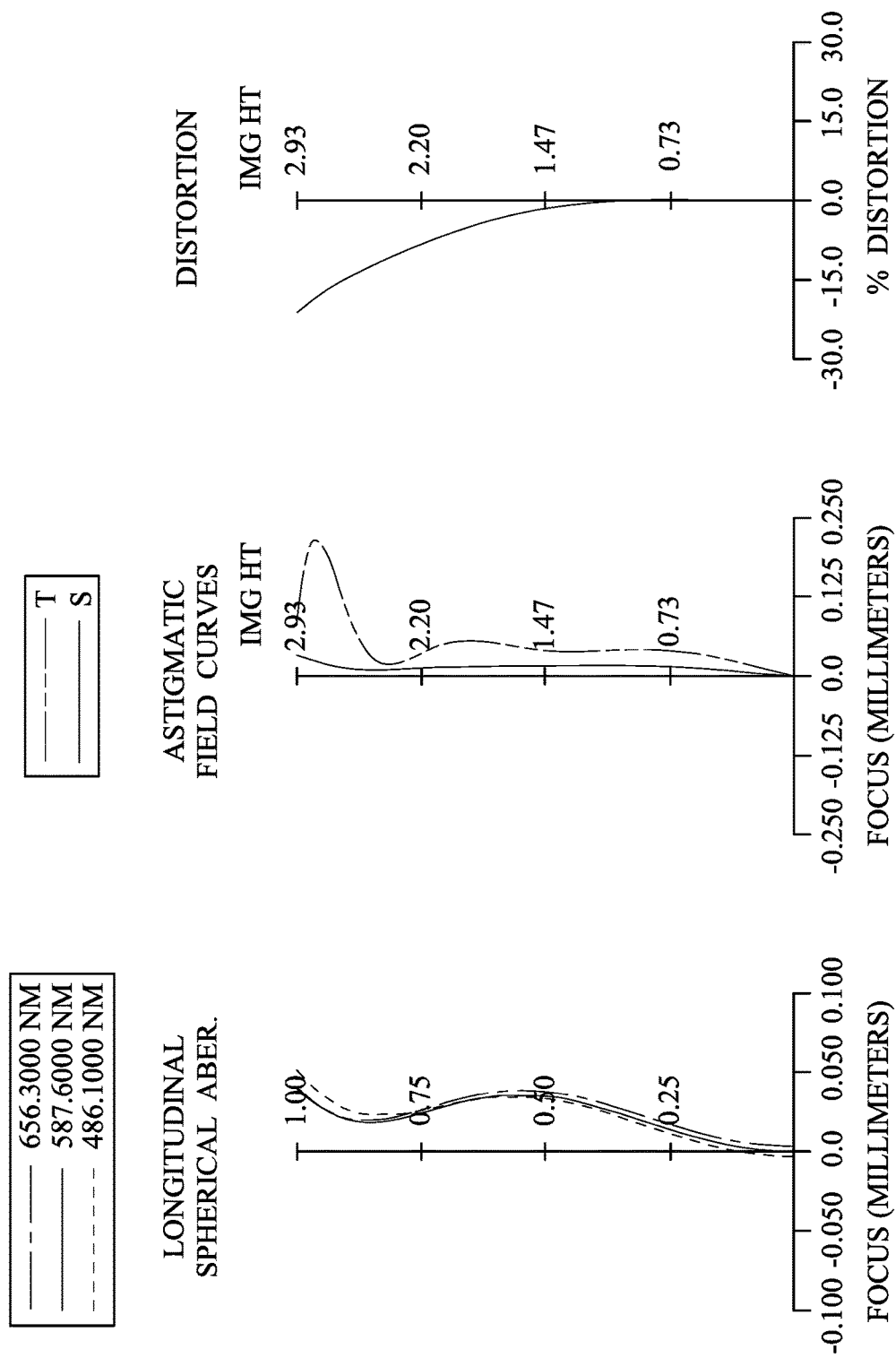
FIG. 6 shows spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows spherical aberration curves, astigmatic field curves and a distortion curve of the image capturing device according to the 3rd embodiment. In FIG. 5, the image capturing device includes an imaging lens system (its reference numeral is omitted) and an image sensor 390. The imaging lens system includes, in order from an object side to an image side, a first lens element 310, an aperture stop 300, a second lens element 320, a third lens element 330, a fourth lens element 340, a fifth lens element 350, a sixth lens element 360, an IR-cut filter 370 and an image surface 380, wherein the image sensor 390 is disposed on the image surface 380 of the imaging lens system. The imaging lens system has a total of six lens elements (310-360), and there is an air space between every two lens elements of the first lens element 310, the second lens element 320, the third lens element 330, the fourth lens element 340, the fifth lens element 350 and the sixth lens element 360 that are adjacent to each other.

The first lens element 310 with negative refractive power has an object-side surface 311 being concave in a paraxial region thereof and an image-side surface 312 being concave in a paraxial region thereof. The first lens element 310 is made of a plastic material, and has the object-side surface 311 and the image-side surface 312 being both aspheric. Furthermore, the object-side surface 311 of the first lens element 310 includes at least one convex shape in an off-axial region thereof.

The second lens element 320 with positive refractive power has an object-side surface 321 being concave and an image-side surface 322 being convex. The second lens element 320 is made of a plastic material, and has the object-side surface 321 and the image-side surface 322 being both aspheric.

The third lens element 330 with positive refractive power has an object-side surface 331 being concave and an image-side surface 332 being convex. The third lens element 330 is made of a plastic material, and has the object-side surface 331 and the image-side surface 332 being both aspheric.

The fourth lens element 340 with positive refractive power has an object-side surface 341 being convex and an image-side surface 342 being convex. The fourth lens element 340 is made of a plastic material, and has the object-side surface 341 and the image-side surface 342 being both aspheric.

The fifth lens element 350 with negative refractive power has an object-side surface 351 being concave in a paraxial region thereof and an image-side surface 352 being convex in a paraxial region thereof. The fifth lens element 350 is made of a plastic material, and has the object-side surface 351 and the image-side surface 352 being both aspheric. Furthermore, the image-side surface 352 of the fifth lens element 350 includes at least one concave shape in an off-axial region thereof.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof.

The IR-cut filter 370 is made of a glass material and located between the sixth lens element 360 and the image surface 380, and will not affect the focal length of the imaging lens system.

The detailed optical data of the 3rd embodiment are shown in Table 5 and the aspheric surface data are shown in Table 6 below.

TABLE 5

3rd Embodiment
f = 2.12 mm, Fno = 2.48, HFOV = 60.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −8.855 ASP | 0.615 | Plastic | 1.544 | 55.9 | −3.56 |
| 2 | | 2.541 ASP | 0.458 | | | | |
| 3 | Ape. Stop | Plano | 0.047 | | | | |
| 4 | Lens 2 | −26.503 ASP | 0.210 | Plastic | 1.639 | 23.5 | 46.56 |
| 5 | | −14.061 ASP | 0.072 | | | | |
| 6 | Lens 3 | −3.699 ASP | 0.705 | Plastic | 1.544 | 55.9 | 3.29 |
| 7 | | −1.288 ASP | 0.030 | | | | |
| 8 | Lens 4 | 3.036 ASP | 1.230 | Plastic | 1.544 | 55.9 | 1.70 |
| 9 | | −1.142 ASP | 0.080 | | | | |
| 10 | Lens 5 | −0.925 ASP | 0.403 | Plastic | 1.639 | 23.5 | −2.54 |
| 11 | | −2.520 ASP | 0.803 | | | | |
| 12 | Lens 6 | 1.704 ASP | 0.370 | Plastic | 1.639 | 23.5 | −8.10 |
| 13 | | 1.173 ASP | 0.450 | | | | |
| 14 | IR-cut filter | Plano | 0.210 | Glass | 1.517 | 64.2 | — |
| 15 | | Plano | 0.301 | | | | |
| 16 | Image | Plano | — | | | | |

Reference wavelength is 587.6 nm (d-line).
Effective radius of surface 10 is 1.320 mm.

TABLE 6

Aspheric Coefficients

| Surface # | | | | | |
|---|---|---|---|---|---|
| 1 | 2 | 4 | 5 | 6 | 7 |

| | 1 | 2 | 4 | 5 | 6 | 7 |
|---|---|---|---|---|---|---|
| k = | −5.0000E+01 | −4.7719E+00 | −9.0000E+01 | −9.0000E+01 | −8.9999E+01 | −8.9599E−01 |
| A4 = | 1.9510E−01 | 4.5547E−01 | −1.0039E−01 | 8.5142E−02 | −7.4819E−02 | −1.6500E−01 |
| A6 = | −1.5862E−01 | −8.9866E−02 | −3.5281E−01 | 1.0601E−01 | 8.3171E−01 | 3.4762E−02 |
| A8 = | 1.2457E−01 | −5.5905E−01 | 4.1695E−01 | −4.2172E−01 | −1.1452E+00 | 1.7320E−01 |
| A10 = | −6.3285E−02 | 2.7622E+00 | −2.5035E+00 | −2.7613E−02 | 5.0741E−01 | −4.5989E−01 |
| A12 = | 1.8443E−03 | −2.7634E+00 | | −8.3185E−02 | 3.5726E−02 | 3.4649E−01 |
| A14 = | −2.2797E−03 | | | | | |

| Surface # | | | | | |
|---|---|---|---|---|---|
| 8 | 9 | 10 | 11 | 12 | 13 |

| | 8 | 9 | 10 | 11 | 12 | 13 |
|---|---|---|---|---|---|---|
| k = | −2.8061E+01 | −4.2246E−01 | −2.2418E+00 | −2.1901E+00 | −1.0127E+01 | −5.4654E+00 |
| A4 = | 2.8941E−02 | 4.0059E−01 | 3.3361E−01 | 1.1689E−01 | −1.8689E−01 | −9.5912E−02 |

TABLE 6-continued

| Aspheric Coefficients | | | | | |
|---|---|---|---|---|---|
| A6 = | 1.8795E−02 | −6.2829E−01 | −5.1548E−01 | 9.7413E−02 | 5.7958E−02 | 2.8035E−02 |
| A8 = | −5.0008E−02 | 5.3497E−01 | 3.9665E−01 | −1.1567E−01 | −1.2174E−02 | −3.0693E−03 |
| A10 = | 3.9423E−02 | −2.1996E−01 | −2.2296E−01 | 3.0129E−02 | 8.9103E−03 | −9.0027E−04 |
| A12 = | −1.1082E−02 | 4.1147E−02 | 8.8507E−02 | 7.9165E−03 | −5.6843E−03 | 3.1868E−04 |
| A14 = | | | −1.5241E−02 | −5.0089E−03 | 1.4924E−03 | −3.7908E−05 |
| A16 = | | | | 6.4154E−04 | −1.3475E−04 | 1.6703E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.12 | T56/T12 | 1.59 |
| Fno | 2.48 | T56/(CT5 + CT6) | 1.04 |
| HFOV [deg.] | 60.1 | Y62/f | 1.09 |
| (V1 + V3 + V4)/(V2 + V5 + V6) | 2.38 | |f/R3| + |f/R4| | 0.23 |
| CT1/CT3 | 0.87 | |f1/f2| | 0.076 |
| CT2/CT1 | 0.34 | |f5/f2| | 0.055 |
| (T12 + T56)/(T23 + T34 + T45) | 7.19 | |f/f3| + |f/f4| | 1.89 |

Moreover, in the imaging lens system according to the 3rd embodiment, when the focal length of the first lens element 310 is f1, the focal length of the second lens element 320 is f2, the focal length of the third lens element 330 is f3, the focal length of the fourth lens element 340 is f4, the focal length of the fifth lens element 350 is f5, and the focal length of the sixth lens element 360 is f6, and |f4| is a minimum value among values of |f1|, |f2|, |f3|, |f4|, |f5| and |f6|.

4th Embodiment

Figure 7:
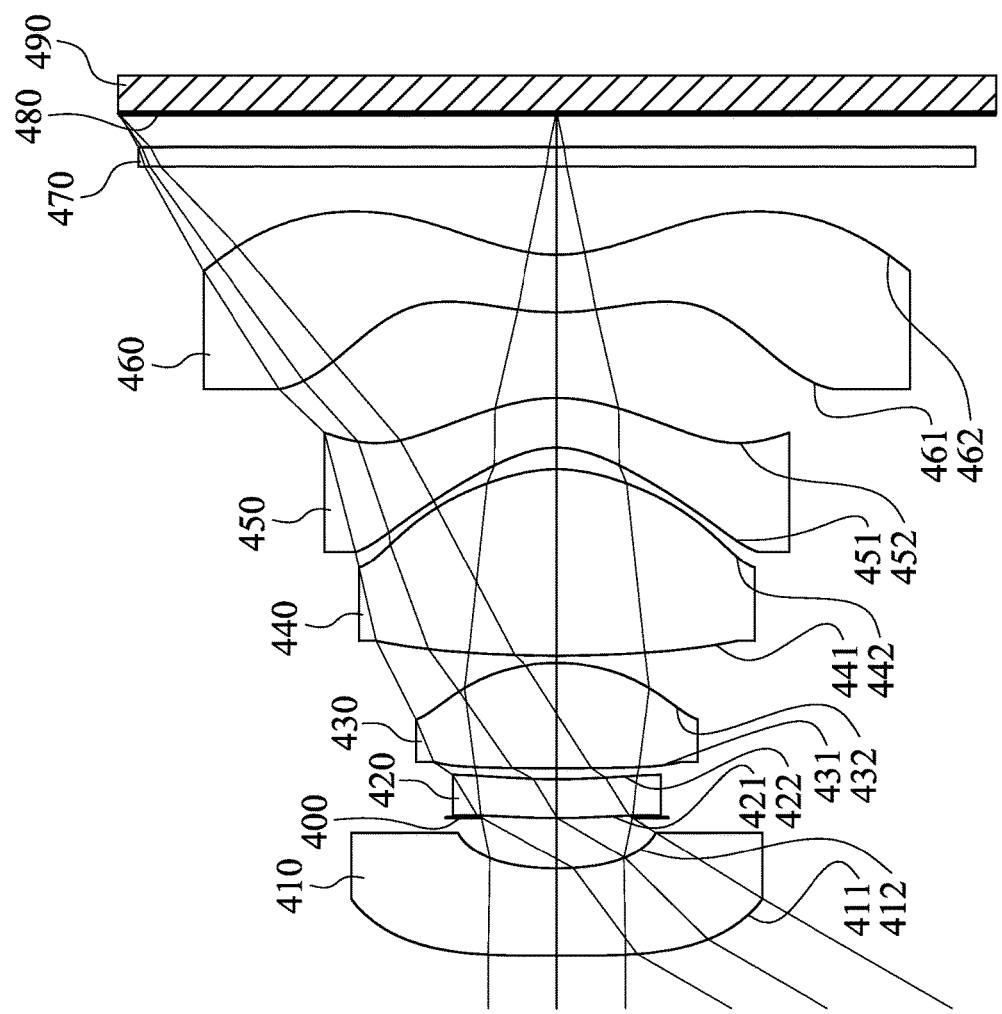
FIG. 7 is a schematic view of an image capturing device according to the 4th embodiment of the present disclosure.
Figure 8:
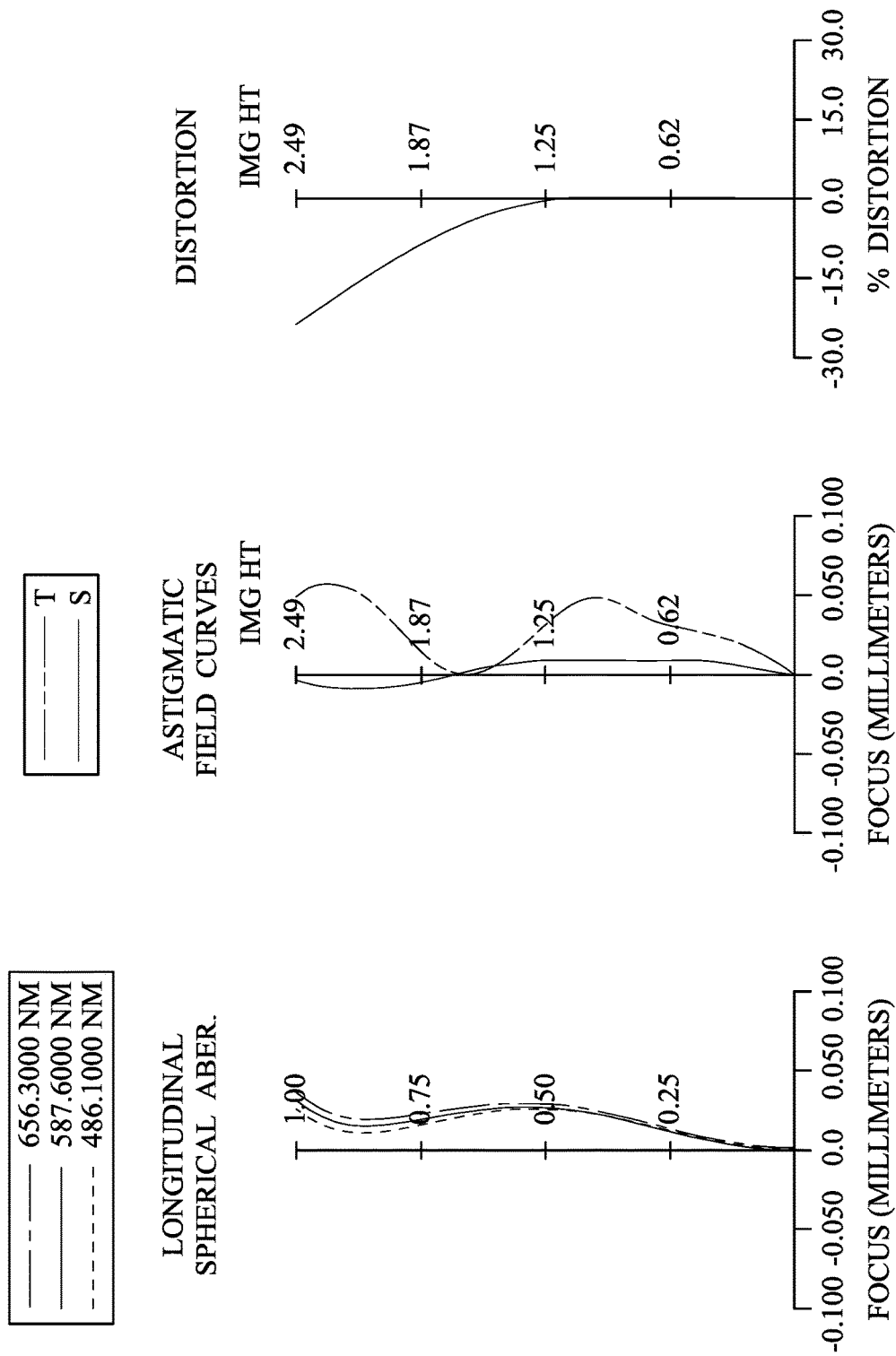
FIG. 8 shows spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows spherical aberration curves, astigmatic field curves and a distortion curve of the image capturing device according to the 4th embodiment. In FIG. 7, the image capturing device includes an imaging lens system (its reference numeral is omitted) and an image sensor 490. The imaging lens system includes, in order from an object side to an image side, a first lens element 410, an aperture stop 400, a second lens element 420, a third lens element 430, a fourth lens element 440, a fifth lens element 450, a sixth lens element 460, an IR-cut filter 470 and an image surface 480, wherein the image sensor 490 is disposed on the image surface 480 of the imaging lens system. The imaging lens system has a total of six lens elements (410-460), and there is an air space between every two lens elements of the first lens element 410, the second lens element 420, the third lens element 430, the fourth lens element 440, the fifth lens element 450 and the sixth lens element 460 that are adjacent to each other.

The first lens element 410 with negative refractive power has an object-side surface 411 being concave in a paraxial region thereof and an image-side surface 412 being concave in a paraxial region thereof. The first lens element 410 is made of a plastic material, and has the object-side surface 411 and the image-side surface 412 being both aspheric. Furthermore, the object-side surface 411 of the first lens element 410 includes at least one convex shape in an off-axial region thereof.

The second lens element 420 with negative refractive power has an object-side surface 421 being convex and an image-side surface 422 being concave. The second lens element 420 is made of a plastic material, and has the object-side surface 421 and the image-side surface 422 being both aspheric.

The third lens element 430 with positive refractive power has an object-side surface 431 being convex and an image-side surface 432 being convex. The third lens element 430 is made of a plastic material, and has the object-side surface 431 and the image-side surface 432 being both aspheric.

The fourth lens element 440 with positive refractive power has an object-side surface 441 being convex and an image-side surface 442 being convex. The fourth lens element 440 is made of a plastic material, and has the object-side surface 441 and the image-side surface 442 being both aspheric.

The fifth lens element 450 with negative refractive power has an object-side surface 451 being concave in a paraxial region thereof and an image-side surface 452 being convex in a paraxial region thereof. The fifth lens element 450 is made of a plastic material, and has the object-side surface 451 and the image-side surface 452 being both aspheric. Furthermore, the image-side surface 452 of the fifth lens element 450 includes at least one concave shape in an off-axial region thereof.

The sixth lens element 460 with negative refractive power has an object-side surface 461 being convex in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof.

The IR-cut filter 470 is made of a glass material and located between the sixth lens element 460 and the image surface 480, and will not affect the focal length of the imaging lens system.

The detailed optical data of the 4th embodiment are shown in Table 7 and the aspheric surface data are shown in Table 8 below.

TABLE 7

4th Embodiment
f = 1.87 mm, Fno = 2.40, HFOV = 60.0 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −100.000 ASP | 0.495 | Plastic | 1.544 | 55.9 | −3.06 |
| 2 | | 1.694 ASP | 0.290 | | | | |
| 3 | Ape. Stop | Plano | −0.002 | | | | |
| 4 | Lens 2 | 4.493 ASP | 0.220 | Plastic | 1.660 | 20.4 | −47.36 |
| 5 | | 3.852 ASP | 0.062 | | | | |
| 6 | Lens 3 | 13.263 ASP | 0.598 | Plastic | 1.545 | 55.9 | 1.90 |
| 7 | | −1.102 ASP | 0.040 | | | | |
| 8 | Lens 4 | 5.627 ASP | 1.061 | Plastic | 1.519 | 56.6 | 1.54 |
| 9 | | −0.869 ASP | 0.123 | | | | |
| 10 | Lens 5 | −0.533 ASP | 0.282 | Plastic | 1.660 | 20.4 | −2.64 |
| 11 | | −0.930 ASP | 0.485 | | | | |
| 12 | Lens 6 | 1.486 ASP | 0.330 | Plastic | 1.582 | 34.3 | −5.54 |
| 13 | | 0.934 ASP | 0.500 | | | | |
| 14 | IR-cut filter | Plano | 0.110 | Glass | 1.517 | 64.2 | — |
| 15 | | Plano | 0.192 | | | | |
| 16 | Image | Plano | — | | | | |

Reference wavelength is 587.6 nm (d-line).

TABLE 8

Aspheric Coefficients

| | Surface # | | | | | |
|---|---|---|---|---|---|---|
| | 1 | 2 | 4 | 5 | 6 | 7 |
| k = | 3.3804E+01 | −2.2722E+01 | −7.0644E+00 | −7.4832E+01 | −8.1432E+01 | 4.1973E−01 |
| A4 = | 2.4018E−01 | 1.2633E+00 | −1.2628E−01 | 7.1738E−03 | −9.9881E−02 | −1.8224E−01 |
| A6 = | −1.3113E−01 | −1.8068E+00 | −2.7985E−02 | −3.6842E−01 | 1.1565E−01 | 3.1831E−01 |
| A8 = | 2.2295E−02 | 3.1694E+00 | −3.6215E−01 | 1.1502E+00 | 1.1641E+00 | 8.5944E−01 |
| A10 = | 1.0713E−01 | 4.1339E+01 | −1.6928E+00 | −2.4167E+00 | −9.1243E−01 | −4.5271E+00 |
| A12 = | −1.0326E−01 | −2.2601E+02 | | 1.6063E−01 | −2.1396E+00 | 8.2327E+00 |
| A14 = | 3.3865E−02 | 4.1595E+02 | | | 2.5758E+00 | −3.8020E+00 |

| | Surface # | | | | | |
|---|---|---|---|---|---|---|
| | 8 | 9 | 10 | 11 | 12 | 13 |
| k = | −4.0051E+01 | −5.4769E−01 | −1.5870E+00 | −1.2509E+00 | −1.0295E+00 | −1.5388E+00 |
| A4 = | −1.4980E−01 | 6.3798E−01 | 9.6742E−01 | 5.3226E−01 | −5.0046E−01 | −3.9657E−01 |
| A6 = | 6.3454E−01 | −1.0549E+00 | −2.7265E+00 | −8.6758E−01 | 1.5654E−01 | 2.4443E−01 |
| A8 = | −1.2254E+00 | 1.2449E+00 | 4.8207E+00 | 1.1072E+00 | −1.8276E−01 | −1.0793E−01 |
| A10 = | 1.2884E+00 | −1.1249E+00 | −5.4445E+00 | −7.4772E−01 | 2.0720E−01 | 3.2171E−02 |
| A12 = | −6.6506E−01 | 6.6601E−01 | 3.6567E+00 | 2.6870E−01 | −9.6546E−02 | −6.0565E−03 |
| A14 = | 1.2606E−01 | −1.4345E−01 | −1.2890E+00 | −4.9382E−02 | 2.0217E−02 | 6.3647E−04 |
| A16 = | | | 1.8180E−01 | 3.6555E−03 | −1.6083E−03 | −2.7719E−05 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.87 | T56/T12 | 1.68 |
| Fno | 2.40 | T56/(CT5 + CT6) | 0.79 |
| HFOV [deg.] | 60.0 | Y62/f | 1.07 |
| (V1 + V3 + V4)/(V2 + V5 + V6) | 2.24 | $|f/R3| + |f/R4|$ | 0.90 |
| CT1/CT3 | 0.83 | $|f1/f2|$ | 0.065 |
| CT2/CT1 | 0.44 | $|f5/f2|$ | 0.056 |
| (T12 + T56)/(T23 + T34 + T45) | 3.44 | $|f/f3| + |f/f4|$ | 2.20 |

Moreover, in the imaging lens system according to the 4th embodiment, when the focal length of the first lens element 410 is f1, the focal length of the second lens element 420 is f2, the focal length of the third lens element 430 is f3, the focal length of the fourth lens element 440 is f4, the focal length of the fifth lens element 450 is f5, and the focal length of the sixth lens element 460 is f6, and |f4| is a minimum value among values of |f1|, |f2|, |f3|, |f4|, |f5| and |f6|.

5th Embodiment

Figure 9:
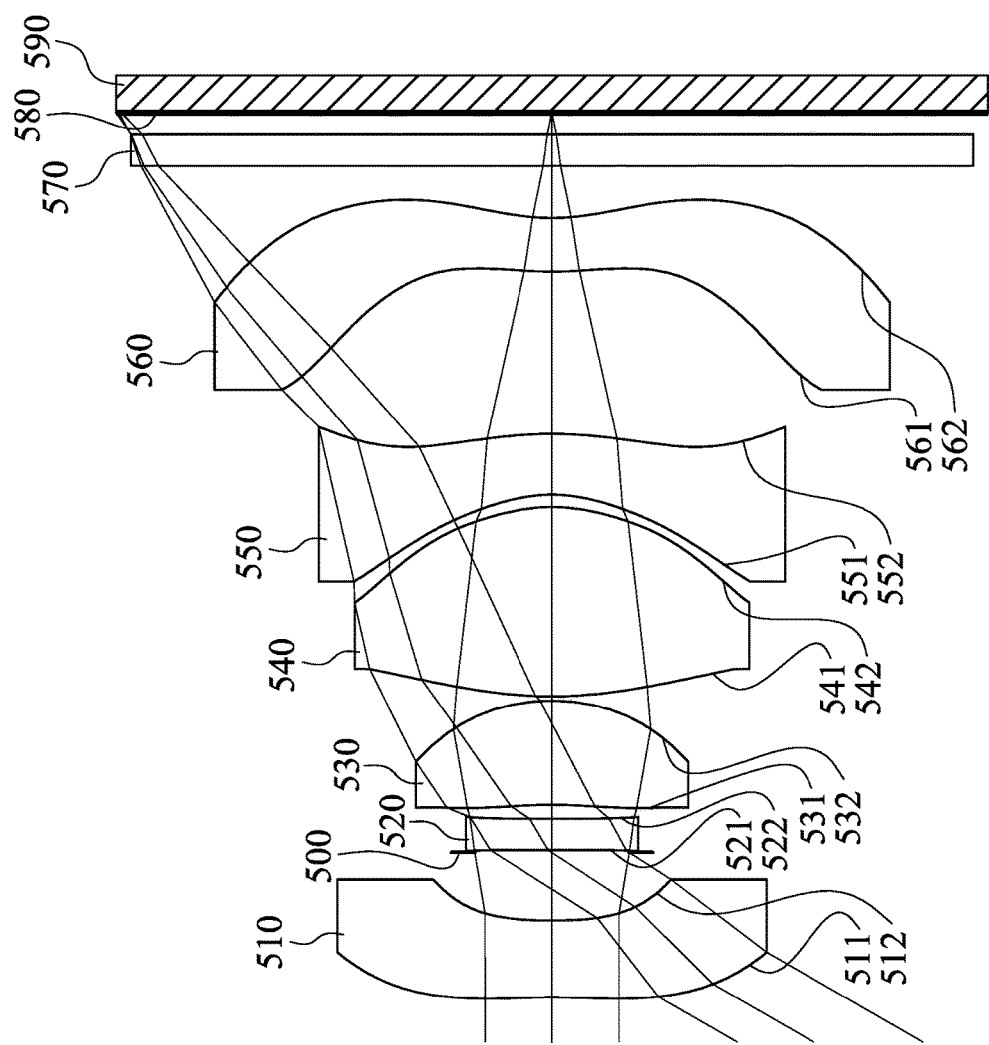
FIG. 9 is a schematic view of an image capturing device according to the 5th embodiment of the present disclosure.
Figure 10:
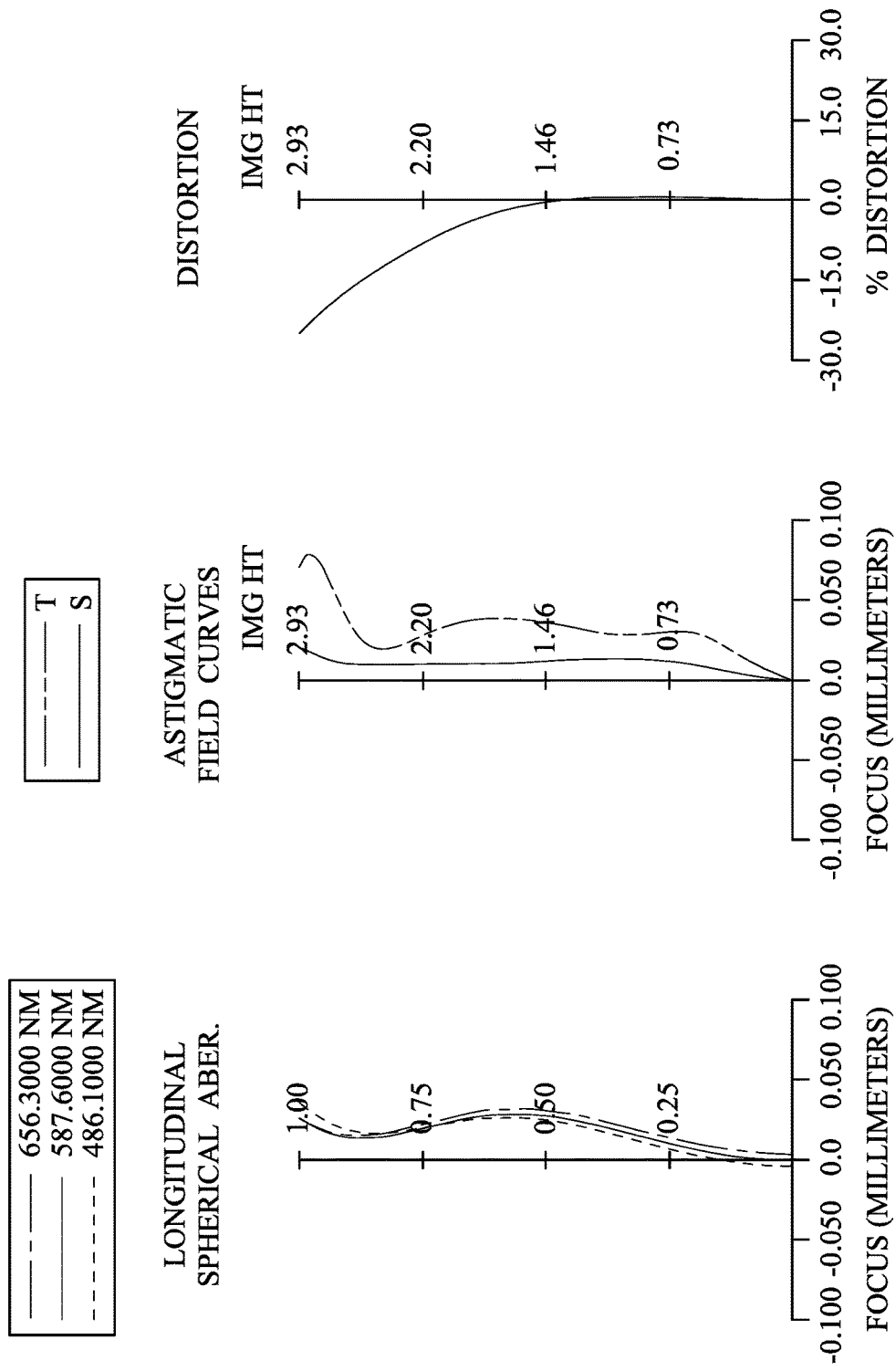
FIG. 10 shows spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows spherical aberration curves, astigmatic field curves and a distortion curve of the image capturing device according to the 5th embodiment. In FIG. 9, the image capturing device includes an imaging lens system (its reference numeral is omitted) and an image sensor 590. The imaging lens system includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the image sensor 590 is disposed on the image surface 580 of the imaging lens system. The imaging lens system has a total of six lens elements (510-560), and there is an air space between every two lens elements of the first lens element 510, the second lens element 520, the third lens element 530, the fourth lens element 540, the fifth lens element 550 and the sixth lens element 560 that are adjacent to each other.

The first lens element 510 with negative refractive power has an object-side surface 511 being concave in a paraxial region thereof and an image-side surface 512 being concave in a paraxial region thereof. The first lens element 510 is made of a plastic material, and has the object-side surface 511 and the image-side surface 512 being both aspheric. Furthermore, the object-side surface 511 of the first lens element 510 includes at least one convex shape in an off-axial region thereof.

The second lens element 520 with positive refractive power has an object-side surface 521 being convex and an image-side surface 522 being convex. The second lens element 520 is made of a plastic material, and has the object-side surface 521 and the image-side surface 522 being both aspheric.

The third lens element 530 with positive refractive power has an object-side surface 531 being concave and an image-side surface 532 being convex. The third lens element 530 is made of a plastic material, and has the object-side surface 531 and the image-side surface 532 being both aspheric.

The fourth lens element 540 with positive refractive power has an object-side surface 541 being convex and an image-side surface 542 being convex. The fourth lens element 540 is made of a plastic material, and has the object-side surface 541 and the image-side surface 542 being both aspheric.

The fifth lens element 550 with negative refractive power has an object-side surface 551 being concave in a paraxial region thereof and an image-side surface 552 being convex in a paraxial region thereof. The fifth lens element 550 is made of a plastic material, and has the object-side surface 551 and the image-side surface 552 being both aspheric. Furthermore, the image-side surface 552 of the fifth lens element 550 includes at least one concave shape in an off-axial region thereof.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof.

The IR-cut filter 570 is made of a glass material and located between the sixth lens element 560 and the image surface 580, and will not affect the focal length of the imaging lens system.

The detailed optical data of the 5th embodiment are shown in Table 9 and the aspheric surface data are shown in Table 10 below.

TABLE 9

5th Embodiment
f = 2.24 mm, Fno = 2.48, HFOV = 60.1 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −6.032 ASP | 0.517 | Plastic | 1.544 | 55.9 | −3.84 |
| 2 | | 3.300 ASP | 0.458 | | | | |
| 3 | Ape. Stop | Plano | 0.016 | | | | |
| 4 | Lens 2 | 100.000 ASP | 0.210 | Plastic | 1.639 | 23.5 | 36.63 |
| 5 | | −30.533 ASP | 0.094 | | | | |
| 6 | Lens 3 | −3.563 ASP | 0.700 | Plastic | 1.544 | 55.9 | 3.77 |
| 7 | | −1.392 ASP | 0.030 | | | | |
| 8 | Lens 4 | 2.836 ASP | 1.273 | Plastic | 1.544 | 55.9 | 1.71 |
| 9 | | −1.167 ASP | 0.083 | | | | |
| 10 | Lens 5 | −1.011 ASP | 0.409 | Plastic | 1.639 | 23.5 | −2.68 |
| 11 | | −2.852 ASP | 1.093 | | | | |
| 12 | Lens 6 | 2.931 ASP | 0.360 | Plastic | 1.639 | 23.5 | −5.42 |
| 13 | | 1.511 ASP | 0.350 | | | | |
| 14 | IR-cut filter | Plano | 0.210 | Glass | 1.517 | 64.2 | — |
| 15 | | Plano | 0.149 | | | | |
| 16 | Image | Plano | — | | | | |

Reference wavelength is 587.6 nm (d-line).
Effective radius of surface 10 is 1.330 mm.

TABLE 10

Aspheric Coefficients

| Surface # | | | | | | |
|---|---|---|---|---|---|---|
| | 1 | 2 | 4 | 5 | 6 | 7 |
| k = | −5.0000E+01 | −8.4110E+00 | −9.0000E+01 | 9.9000E+01 | −6.8057E+01 | −5.2885E−01 |
| A4 = | 2.2158E−01 | 4.8974E−01 | 1.9859E−02 | 2.1160E−01 | −1.3395E−03 | −1.4302E−01 |
| A6 = | −1.8255E−01 | −8.5398E−02 | −1.8890E−01 | 5.2606E−02 | 5.0017E−01 | 1.5680E−04 |
| A8 = | 1.3807E−01 | −6.6627E−01 | −7.0037E−01 | −8.3756E−01 | −6.6808E−01 | 8.6950E−02 |
| A10 = | −6.7026E−02 | 2.8108E+00 | −3.9071E−02 | 6.6987E−01 | 2.5532E−01 | −2.1536E−01 |
| A12 = | 1.8648E−02 | −2.6165E+00 | | −8.3185E−02 | 2.8511E−02 | 1.5395E−01 |
| A14 = | −2.2508E−03 | | | | | |

| Surface # | | | | | |
|---|---|---|---|---|---|
| 8 | 9 | 10 | 11 | 12 | 13 |
| k = −9.4744E+00 | −4.6506E−01 | −2.2160E+00 | −1.6804E+00 | −2.5851E+01 | −1.2181E+00 |
| A4 = −2.2360E−02 | 4.2435E−01 | 2.9656E−01 | 7.6949E−02 | −2.3252E−01 | −3.1912E−01 |
| A6 = 5.4336E−02 | −7.2996E−01 | −6.7863E−01 | −4.0934E−02 | −9.6402E−02 | 1.6104E−01 |
| A8 = −6.9790E−02 | 6.4508E−01 | 7.5014E−01 | 1.3393E−01 | 2.2752E−01 | −5.2802E−02 |
| A10 = 4.0022E−02 | −2.7809E−01 | −4.6807E−01 | −1.3743E−01 | −1.5722E−01 | 1.0383E−02 |
| A12 = −8.9885E−03 | 5.0438E−02 | 1.5642E−01 | 6.6635E−02 | 5.5010E−02 | −1.1939E−03 |
| A14 = | | −2.1235E−02 | −1.6102E−02 | −9.5637E−03 | 7.4288E−05 |
| A16 = | | | 1.5579E−03 | 6.5396E−04 | −1.9544E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.24 | T56/T12 | 2.31 |
| Fno | 2.48 | T56/(CT5 + CT6) | 1.42 |
| HFOV [deg.] | 60.1 | Y62/f | 1.01 |
| (V1 + V3 + V4)/(V2 + V5 + V6) | 2.38 | |f/R3| + |f/R4| | 0.10 |
| CT1/CT3 | 0.74 | |f1/f2| | 0.105 |
| CT2/CT1 | 0.41 | |f5/f2| | 0.073 |
| (T12 + T56)/(T23 + T34 + T45) | 7.57 | |f/f3| + |f/f4| | 1.90 |

Moreover, in the imaging lens system according to the 5th embodiment, when the focal length of the first lens element 510 is f1, the focal length of the second lens element 520 is f2, the focal length of the third lens element 530 is f3, the focal length of the fourth lens element 540 is f4, the focal length of the fifth lens element 550 is f5, and the focal length of the sixth lens element 560 is f6, and |f4| is a minimum value among values of |f1|, |f2|, |f3|, |f4|, |f5| and |f6|.

6th Embodiment

Figure 11:
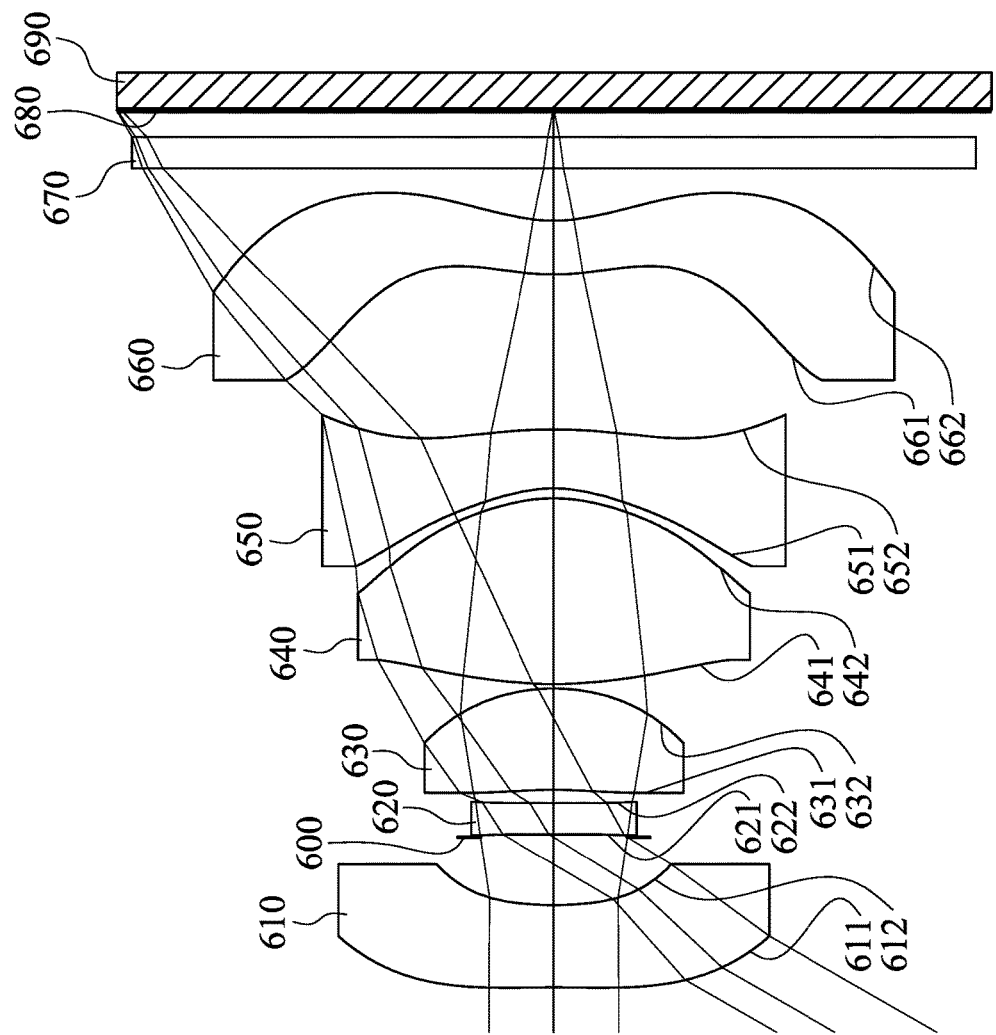
FIG. 11 is a schematic view of an image capturing device according to the 6th embodiment of the present disclosure.
Figure 12:
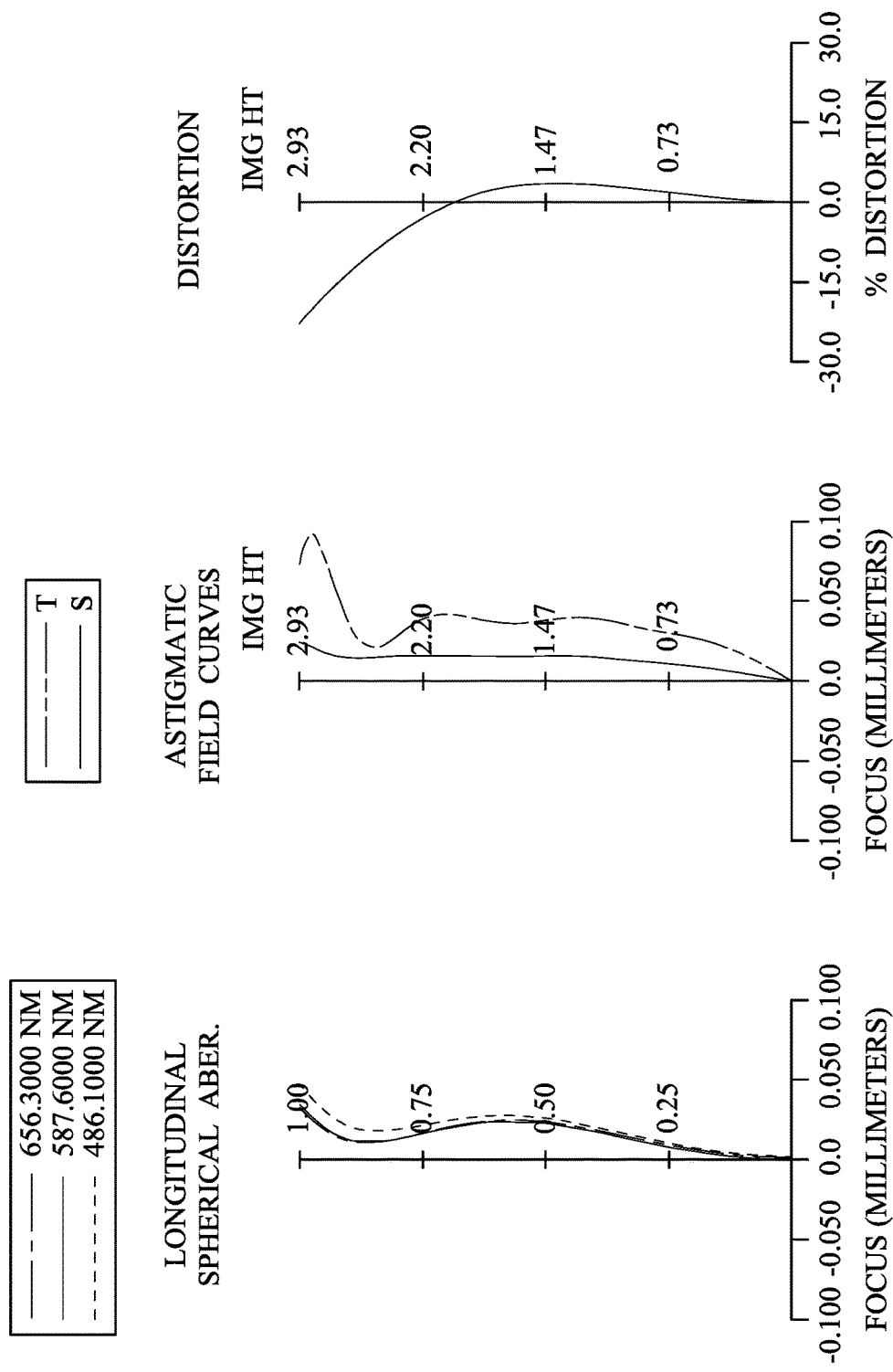
FIG. 12 shows spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows spherical aberration curves, astigmatic field curves and a distortion curve of the image capturing device according to the 6th embodiment. In FIG. 11, the image capturing device includes an imaging lens system (its reference numeral is omitted) and an image sensor 690. The imaging lens system includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the image sensor 690 is disposed on the image surface 680 of the imaging lens system. The imaging lens system has a total of six lens elements (610-660), and there is an air space between every two lens elements of the first lens element 610, the second lens element 620, the third lens element 630, the fourth lens element 640, the fifth lens element 650 and the sixth lens element 660 that are adjacent to each other.

The first lens element 610 with negative refractive power has an object-side surface 611 being concave in a paraxial region thereof and an image-side surface 612 being concave in a paraxial region thereof. The first lens element 610 is made of a plastic material, and has the object-side surface 611 and the image-side surface 612 being both aspheric. Furthermore, the object-side surface 611 of the first lens element 610 includes at least one convex shape in an off-axial region thereof.

The second lens element 620 with positive refractive power has an object-side surface 621 being concave and an image-side surface 622 being convex. The second lens element 620 is made of a plastic material, and has the object-side surface 621 and the image-side surface 622 being both aspheric.

The third lens element 630 with positive refractive power has an object-side surface 631 being concave and an image-side surface 632 being convex. The third lens element 630 is made of a plastic material, and has the object-side surface 631 and the image-side surface 632 being both aspheric.

The fourth lens element 640 with positive refractive power has an object-side surface 641 being convex and an image-side surface 642 being convex. The fourth lens element 640 is made of a plastic material, and has the object-side surface 641 and the image-side surface 642 being both aspheric.

The fifth lens element 650 with negative refractive power has an object-side surface 651 being concave in a paraxial region thereof and an image-side surface 652 being convex in a paraxial region thereof. The fifth lens element 650 is made of a plastic material, and has the object-side surface 651 and the image-side surface 652 being both aspheric.

Furthermore, the image-side surface 652 of the fifth lens element 650 includes at least one concave shape in an off-axial region thereof.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric.

Furthermore, the image-side surface 662 of the sixth lens element 660 includes at least one convex shape in an off-axial region thereof.

The IR-cut filter 670 is made of a glass material and located between the sixth lens element 660 and the image surface 680, and will not affect the focal length of the imaging lens system.

The detailed optical data of the 6th embodiment are shown in Table 11 and the aspheric surface data are shown in Table 12 below.

TABLE 11

6th Embodiment
f = 2.17 mm, Fno = 2.48, HFOV = 60.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −12.150 ASP | 0.553 | Plastic | 1.544 | 56.0 | −3.93 |
| 2 | | 2.637 ASP | 0.458 | | | | |
| 3 | Ape. Stop | Plano | 0.020 | | | | |
| 4 | Lens 2 | −88.331 ASP | 0.210 | Plastic | 1.639 | 23.3 | 2149.42 |
| 5 | | −83.069 ASP | 0.088 | | | | |
| 6 | Lens 3 | −4.177 ASP | 0.681 | Plastic | 1.544 | 56.0 | 3.39 |
| 7 | | −1.355 ASP | 0.030 | | | | |
| 8 | Lens 4 | 2.973 ASP | 1.250 | Plastic | 1.544 | 56.0 | 1.69 |
| 9 | | −1.131 ASP | 0.066 | | | | |
| 10 | Lens 5 | −1.045 ASP | 0.396 | Plastic | 1.639 | 23.3 | −2.51 |
| 11 | | −3.451 ASP | 1.045 | | | | |
| 12 | Lens 6 | 1.783 ASP | 0.360 | Plastic | 1.639 | 23.3 | −7.57 |
| 13 | | 1.200 ASP | 0.350 | | | | |
| 14 | IR-cut filter | Plano | 0.210 | Glass | 1.517 | 64.2 | — |
| 15 | | Plano | 0.181 | | | | |
| 16 | Image | Plano | — | | | | |

Reference wavelength is 587.6 nm (d-line).
Effective radius of surface 10 is 1.330 mm.

TABLE 12

Aspheric Coefficients

| Surface # | | | | | |
|---|---|---|---|---|---|
| 1 | 2 | 4 | 5 | 6 | 7 |
| k = −4.6816E+01 | −1.1532E+01 | 1.1212E+00 | 9.1922E+01 | −6.0614E+01 | −6.4191E−01 |
| A4 = 2.0471E−01 | 4.8668E−01 | −2.5155E−02 | 1.4797E−01 | 4.3264E−02 | −1.3665E−01 |
| A6 = −1.5725E−01 | −1.2498E−01 | −4.0176E−01 | 4.6232E−02 | 3.6027E−01 | 1.0410E−02 |
| A8 = 1.1560E−01 | −4.2882E−01 | 5.9523E−01 | −7.9575E−01 | −5.1147E−01 | 7.5905E−02 |
| A10 = −5.4794E−02 | 2.1754E+00 | −2.2773E+00 | 1.2200E+00 | 1.7188E−01 | −2.0207E−01 |
| A12 = 1.4888E−02 | −2.0854E+00 | | −1.0687E+00 | 2.7490E−02 | 1.2281E−01 |
| A14 = −1.7281E−03 | | | | | |

| Surface # | | | | | |
|---|---|---|---|---|---|
| 8 | 9 | 10 | 11 | 12 | 13 |
| k = −8.6851E+00 | −4.9599E−01 | −2.6043E+00 | −1.7284E+00 | −1.1005E+01 | −1.3039E+00 |
| A4 = −3.0782E−02 | 3.7182E−01 | 2.0169E−01 | 4.5323E−02 | −1.9267E−01 | −3.4814E−01 |
| A6 = 7.8832E−02 | −5.1889E−01 | −3.0093E−01 | 9.6141E−02 | −1.2027E−01 | 1.8892E−01 |
| A8 = −9.8780E−02 | 3.9604E−01 | 2.2276E−01 | −5.9923E−02 | 1.8376E−01 | −6.9611E−02 |
| A10 = 5.4478E−02 | −1.4988E−01 | −1.3052E−01 | −3.9027E−03 | −1.0707E−01 | 1.6399E−02 |
| A12 = −1.2944E−02 | 2.5613E−02 | 5.7996E−02 | 1.6392E−02 | 3.3792E−02 | −2.4143E−03 |
| A14 = | | −1.1089E−02 | −6.0566E−03 | −5.3883E−03 | 2.0241E−04 |
| A16 = | | 7.1410E−04 | 3.3457E−04 | | −7.3416E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.17 | T56/T12 | 2.19 |
| Fno | 2.48 | T56/(CT5 + CT6) | 1.38 |
| HFOV [deg.] | 60.2 | Y62/f | 1.05 |
| (V1 + V3 + V4)/(V2 + V5 + V6) | 2.40 | \|f/R3\| + \|f/R4\| | 0.05 |
| CT1/CT3 | 0.81 | \|f1/f2\| | 0.002 |
| CT2/CT1 | 0.38 | \|f5/f2\| | 0.001 |
| (T12 + T56)/(T23 + T34 + T45) | 8.28 | \|f/f3\| + \|f/f4\| | 1.92 |

Moreover, in the imaging lens system according to the 6th embodiment, when the focal length of the first lens element 610 is f1, the focal length of the second lens element 620 is f2, the focal length of the third lens element 630 is f3, the focal length of the fourth lens element 640 is f4, the focal length of the fifth lens element 650 is f5, and the focal length of the sixth lens element 660 is f6, and |f4| is a minimum value among values of |f1|, |f2|, |f3|, |f4|, |f5| and |f6|.

7th Embodiment

Figure 13:
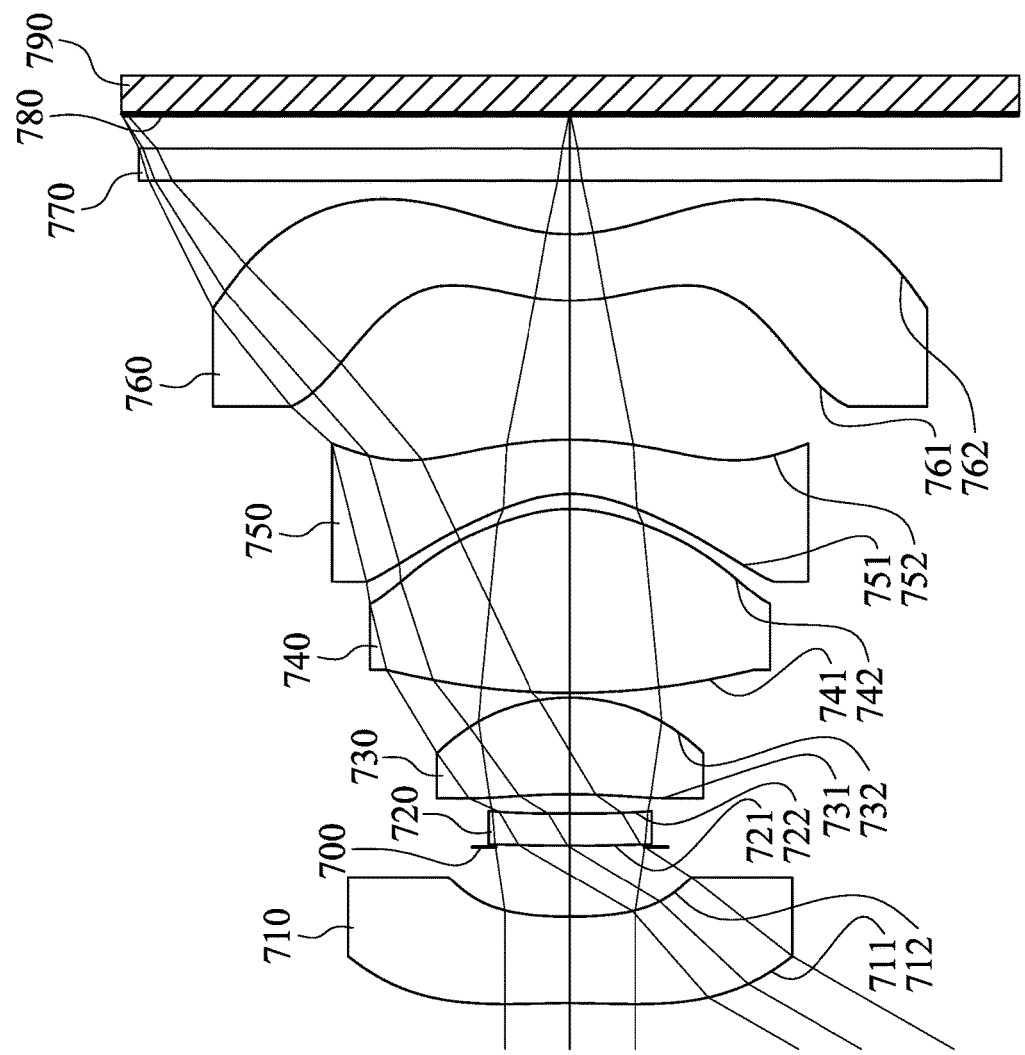
FIG. 13 is a schematic view of an image capturing device according to the 7th embodiment of the present disclosure.
Figure 14:
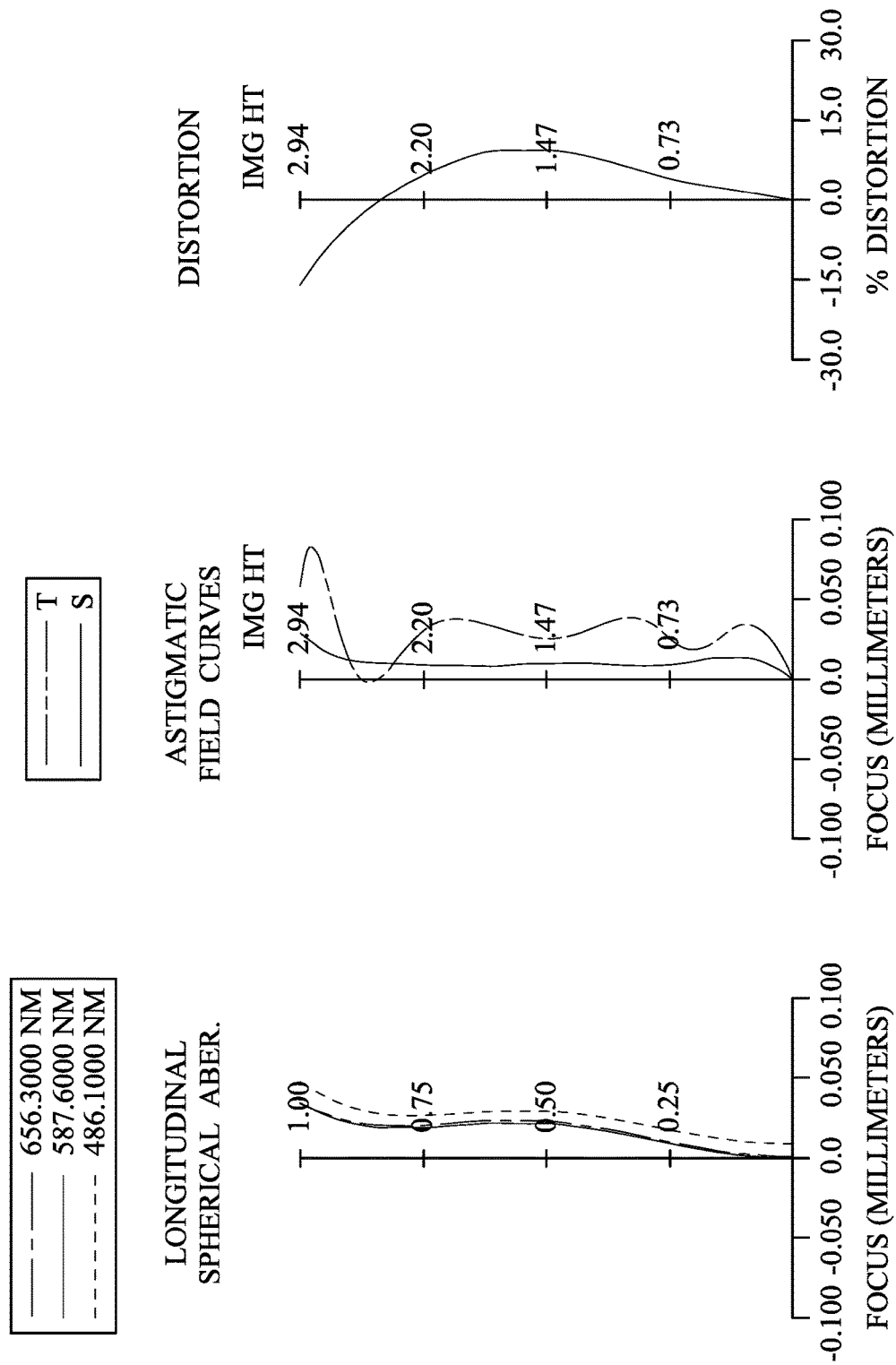
FIG. 14 shows spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows spherical aberration curves, astigmatic field curves and a distortion curve of the image capturing device according to the 7th embodiment. In FIG. 13, the image capturing device includes an imaging lens system (its reference numeral is omitted) and an image sensor 790. The imaging lens system includes, in order from an object side to an image side, a first lens element 710, an aperture stop 700, a second lens element 720, a third lens element 730, a fourth lens element 740, a fifth lens element 750, a sixth lens element 760, an IR-cut filter 770 and an image surface 780, wherein the image sensor 790 is disposed on the image surface 780 of the imaging lens system. The imaging lens system has a total of six lens elements (710-760), and there is an air space between every two lens elements of the first lens element 710, the second lens element 720, the third lens element 730, the fourth lens element 740, the fifth lens element 750 and the sixth lens element 760 that are adjacent to each other.

The first lens element 710 with negative refractive power has an object-side surface 711 being concave in a paraxial region thereof and an image-side surface 712 being concave in a paraxial region thereof. The first lens element 710 is made of a plastic material, and has the object-side surface 711 and the image-side surface 712 being both aspheric. Furthermore, the object-side surface 711 of the first lens element 710 includes at least one convex shape in an off-axial region thereof.

The second lens element 720 with positive refractive power has an object-side surface 721 being convex and an image-side surface 722 being concave. The second lens element 720 is made of a plastic material, and has the object-side surface 721 and the image-side surface 722 being both aspheric.

The third lens element 730 with positive refractive power has an object-side surface 731 being concave and an image-side surface 732 being convex. The third lens element 730 is made of a plastic material, and has the object-side surface 731 and the image-side surface 732 being both aspheric.

The fourth lens element 740 with positive refractive power has an object-side surface 741 being convex and an image-side surface 742 being convex. The fourth lens element 740 is made of a plastic material, and has the object-side surface 741 and the image-side surface 742 being both aspheric.

The fifth lens element 750 with negative refractive power has an object-side surface 751 being concave in a paraxial region thereof and an image-side surface 752 being convex in a paraxial region thereof. The fifth lens element 750 is made of a plastic material, and has the object-side surface 751 and the image-side surface 752 being both aspheric. Furthermore, the image-side surface 752 of the fifth lens element 750 includes at least one concave shape in an off-axial region thereof.

The sixth lens element 760 with positive refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axial region thereof.

The IR-cut filter 770 is made of a glass material and located between the sixth lens element 760 and the image surface 780, and will not affect the focal length of the imaging lens system.

The detailed optical data of the 7th embodiment are shown in Table 13 and the aspheric surface data are shown in Table 14 below.

TABLE 13

7th Embodiment
f = 1.99 mm, Fno = 2.33, HFOV = 60.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.994 | ASP | 0.565 | Plastic | 1.544 | 56.0 | −4.03 |
| 2 | | 3.292 | ASP | 0.458 | | | | |
| 3 | Ape. Stop | Plano | | 0.009 | | | | |
| 4 | Lens 2 | 12.935 | ASP | 0.210 | Plastic | 1.660 | 20.4 | 46.55 |
| 5 | | 22.198 | ASP | 0.126 | | | | |
| 6 | Lens 3 | −4.761 | ASP | 0.631 | Plastic | 1.544 | 56.0 | 3.06 |
| 7 | | −1.292 | ASP | 0.030 | | | | |

TABLE 13-continued

7th Embodiment
f = 1.99 mm, Fno = 2.33, HFOV = 60.2 deg.

| Surface # | | Curvature Radius | Thickness | Material | Index | Abbe # | Focal Length |
|---|---|---|---|---|---|---|---|
| 8 | Lens 4 | 4.678 ASP | 1.205 | Plastic | 1.544 | 56.0 | 1.61 |
| 9 | | −0.978 ASP | 0.099 | | | | |
| 10 | Lens 5 | −0.845 ASP | 0.353 | Plastic | 1.650 | 21.4 | −2.05 |
| 11 | | −2.694 ASP | 0.911 | | | | |
| 12 | Lens 6 | 1.352 ASP | 0.435 | Plastic | 1.639 | 23.5 | 39.64 |
| 13 | | 1.250 ASP | 0.350 | | | | |
| 14 | IR-cut filter | Plano | 0.210 | Glass | 1.517 | 64.2 | — |
| 15 | | Plano | 0.224 | | | | |
| 16 | Image | Plano | — | | | | |

Reference wavelength is 587.6 nm (d-line).
Effective radius of surface 10 is 1.330 mm.

TABLE 14

Aspheric Coefficients

| | Surface # | | | | | |
|---|---|---|---|---|---|---|
| | 1 | 2 | 4 | 5 | 6 | 7 |
| k = | −4.6816E+01 | −1.0246E+01 | −7.9773E+01 | 9.1922E+01 | −3.5729E+00 | −6.4118E−01 |
| A4 = | 2.1561E−01 | 4.5532E−01 | 2.3166E−02 | 1.0128E−01 | −2.3719E−02 | −1.3761E−01 |
| A6 = | −1.8428E−01 | −3.2481E−02 | 1.3457E−01 | 3.7895E−01 | 4.4059E−01 | 5.7172E−02 |
| A8 = | 1.4808E−01 | −8.3497E−01 | −1.4693E+00 | −1.3909E+00 | −3.6605E−01 | 1.4309E−01 |
| A10 = | −7.6852E−02 | 3.1577E+00 | 9.1389E−01 | 1.4429E+00 | 2.9669E−02 | −4.0478E−01 |
| A12 = | 2.3079E−02 | −2.8955E+00 | | −8.4700E−01 | 2.7490E−02 | 2.7580E−01 |
| A14 = | −3.0512E−03 | | | | | |

| | Surface # | | | | | |
|---|---|---|---|---|---|---|
| | 8 | 9 | 10 | 11 | 12 | 13 |
| k = | −8.6851E+00 | −6.1025E−01 | −3.1261E+00 | −4.6950E−01 | −1.1862E+01 | −1.1305E+00 |
| A4 = | −2.8138E−02 | 5.1097E−01 | 9.2493E−02 | −2.9725E−02 | 6.3582E−02 | −2.3410E−01 |
| A6 = | 1.2587E−01 | −6.5494E−01 | −1.5509E−01 | 1.4260E−01 | −4.7136E−01 | 5.8418E−02 |
| A8 = | −1.6268E−01 | 4.8710E−01 | 1.1387E−01 | −7.0979E−02 | 4.0045E−01 | 4.7872E−04 |
| A10 = | 9.2442E−02 | −1.8863E−01 | −6.3642E−02 | 1.6286E−02 | −1.9063E−01 | −5.6869E−03 |
| A12 = | −2.0006E−02 | 3.5119E−02 | 2.8192E−02 | −4.7286E−04 | 5.5873E−02 | 1.7234E−03 |
| A14 = | | | −5.2275E−03 | −8.2154E−04 | −8.9834E−03 | −2.2199E−04 |
| A16 = | | | | 1.4996E−04 | 5.9407E−04 | 1.0913E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.99 | T56/T12 | 1.95 |
| Fno | 2.33 | T56/(CT5 + CT6) | 1.16 |
| HFOV [deg.] | 60.2 | Y62/f | 1.17 |
| (V1 + V3 + V4)/(V2 + V5 + V6) | 2.57 | |f/R3| + |f/R4| | 0.24 |
| CT1/CT3 | 0.90 | |f1/f2| | 0.087 |
| CT2/CT1 | 0.37 | |f5/f2| | 0.044 |
| (T12 + T56)/(T23 + T34 + T45) | 5.40 | |f/f3| + |f/f4| | 1.89 |

Moreover, in the imaging lens system according to the 7th embodiment, when the focal length of the first lens element 710 is f1, the focal length of the second lens element 720 is f2, the focal length of the third lens element 730 is f3, the focal length of the fourth lens element 740 is f4, the focal length of the fifth lens element 750 is f5, and the focal length of the sixth lens element 760 is f6, and |f4| is a minimum value among values of |f1|, |f2|, |f3|, |f4|, |f5| and |f6|.

8th Embodiment

Figure 15:
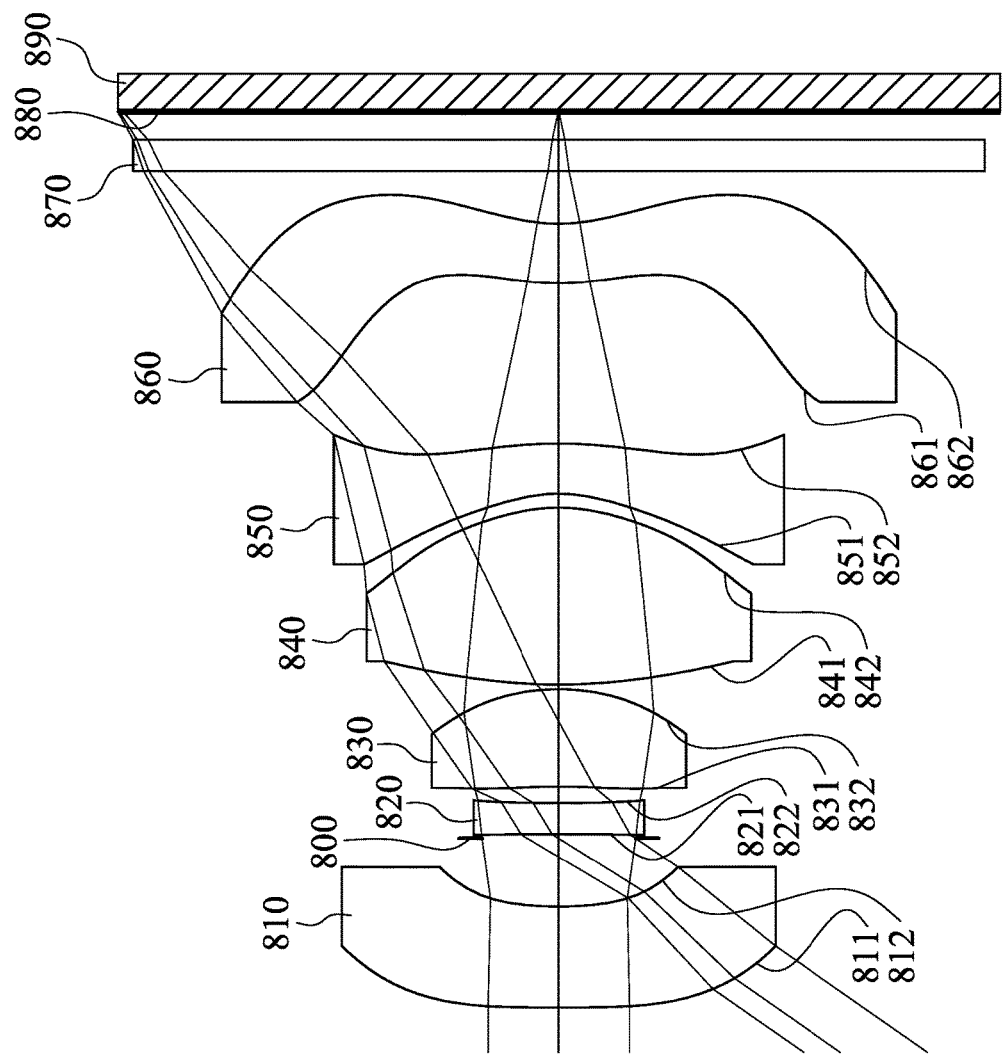
FIG. 15 is a schematic view of an image capturing device according to the 8th embodiment of the present disclosure.
Figure 16:
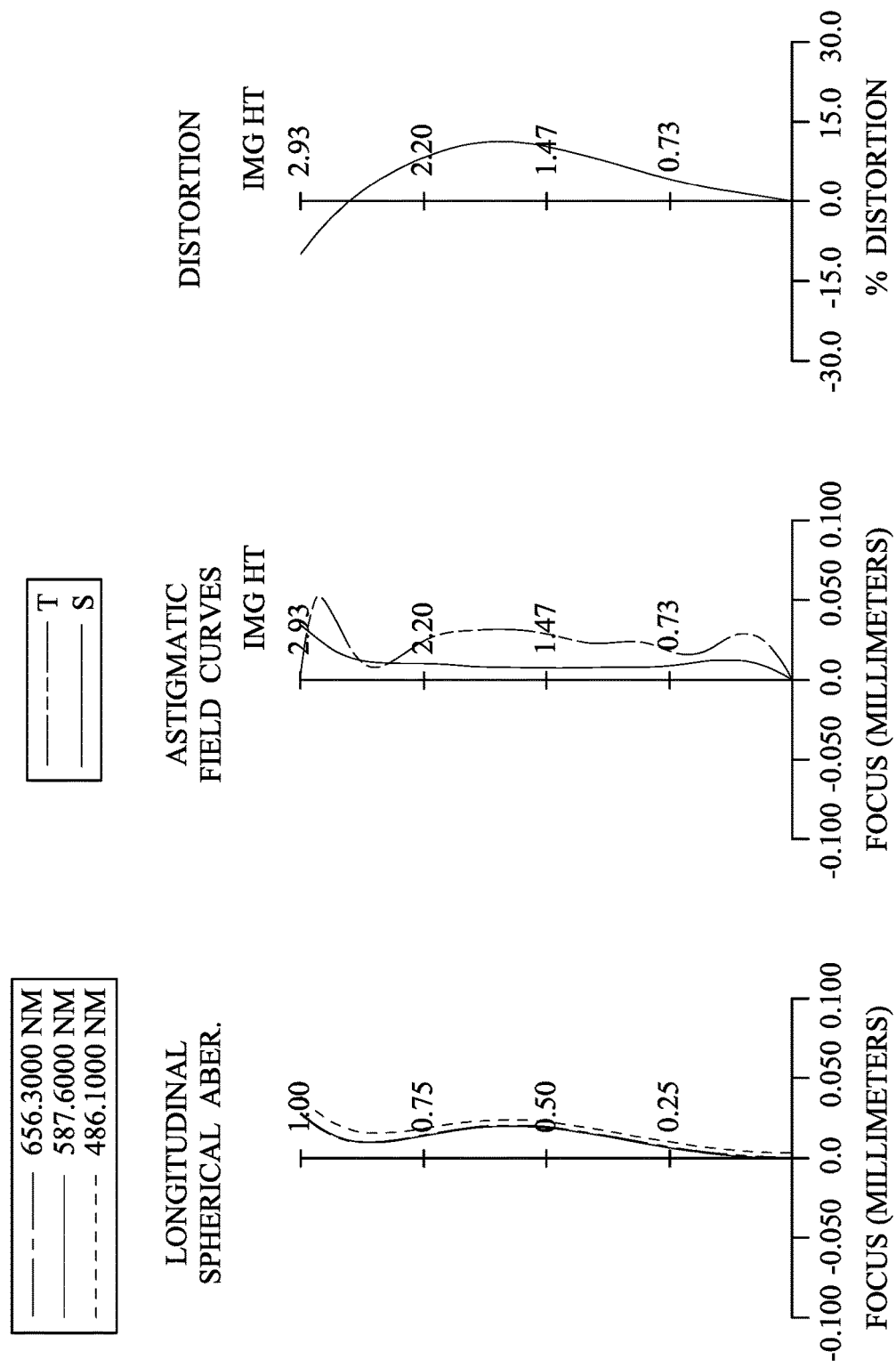
FIG. 16 shows spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows spherical aberration curves, astigmatic field curves and a distortion curve of the image capturing device according to the 8th embodiment. In FIG. 15, the image capturing device includes an imaging lens system (its reference numeral is omitted) and an image sensor 890. The imaging lens system includes, in order from an object side to an image side, a first lens element 810, an aperture stop 800, a second lens element 820, a third lens element 830, a fourth lens element 840, a fifth lens element 850, a sixth lens element 860, an IR-cut filter 870 and an image surface 880, wherein the image sensor 890 is disposed on the image surface 880 of the imaging lens system. The imaging lens system has a total of six lens elements (810-860), and there is an air space between every two lens elements of the first lens element 810, the second lens element 820, the third lens element 830, the fourth lens element 840, the fifth lens element 850 and the sixth lens element 860 that are adjacent to each other.

The first lens element 810 with negative refractive power has an object-side surface 811 being convex in a paraxial region thereof and an image-side surface 812 being concave in a paraxial region thereof. The first lens element 810 is made of a plastic material, and has the object-side surface 811 and the image-side surface 812 being both aspheric.

The second lens element 820 with negative refractive power has an object-side surface 821 being concave and an image-side surface 822 being concave. The second lens element 820 is made of a plastic material, and has the object-side surface 821 and the image-side surface 822 being both aspheric.

The third lens element 830 with positive refractive power has an object-side surface 831 being concave and an image-side surface 832 being convex. The third lens element 830 is made of a plastic material, and has the object-side surface 831 and the image-side surface 832 being both aspheric.

The fourth lens element 840 with positive refractive power has an object-side surface 841 being convex and an image-side surface 842 being convex. The fourth lens element 840 is made of a plastic material, and has the object-side surface 841 and the image-side surface 842 being both aspheric.

The fifth lens element 850 with negative refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric. Furthermore, the image-side surface 852 of the fifth lens element 850 includes at least one concave shape in an off-axial region thereof.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex shape in an off-axial region thereof.

The IR-cut filter 870 is made of a glass material and located between the sixth lens element 860 and the image surface 880, and will not affect the focal length of the imaging lens system.

The detailed optical data of the 8th embodiment are shown in Table 15 and the aspheric surface data are shown in Table 16 below.

TABLE 15

8th Embodiment
f = 2.27 mm, Fno = 2.40, HFOV = 55.0 deg.

| Surface # |  | Curvature Radius | Thickness | Material | Index | Abbe # | Focal Length |
|---|---|---|---|---|---|---|---|
| 0 | Object | Plano | Infinity |  |  |  |  |
| 1 | Lens 1 | 100.000 ASP | 0.673 | Plastic | 1.544 | 56.0 | −5.15 |
| 2 |  | 2.724 ASP | 0.458 |  |  |  |  |
| 3 | Ape. Stop | Plano | 0.027 |  |  |  |  |
| 4 | Lens 2 | −42.459 ASP | 0.210 | Plastic | 1.639 | 23.3 | −49.29 |
| 5 |  | 122.022 ASP | 0.108 |  |  |  |  |
| 6 | Lens 3 | −5.579 ASP | 0.650 | Plastic | 1.544 | 56.0 | 3.58 |
| 7 |  | −1.503 ASP | 0.030 |  |  |  |  |
| 8 | Lens 4 | 3.500 ASP | 1.185 | Plastic | 1.544 | 56.0 | 1.74 |
| 9 |  | −1.144 ASP | 0.092 |  |  |  |  |
| 10 | Lens 5 | −1.056 ASP | 0.335 | Plastic | 1.639 | 23.3 | −2.65 |
| 11 |  | −3.163 ASP | 1.071 |  |  |  |  |
| 12 | Lens 6 | 1.742 ASP | 0.399 | Plastic | 1.639 | 23.3 | −10.34 |
| 13 |  | 1.256 ASP | 0.350 |  |  |  |  |
| 14 | IR-cut filter | Plano | 0.210 | Glass | 1.517 | 64.2 | — |
| 15 |  | Plano | 0.188 |  |  |  |  |
| 16 | Image | Plano | — |  |  |  |  |

Reference wavelength is 587.6 nm (d-line).
Effective radius of surface 10 is 1.300 mm.

TABLE 16

Aspheric Coefficients

| Surface # | 1 | 2 | 4 | 5 | 6 | 7 |
|---|---|---|---|---|---|---|
| k = | −4.6816E+01 | −1.2731E+01 | −1.0079E+01 | 9.1922E+01 | −9.0000E+01 | −5.1338E−01 |
| A4 = | 1.5690E−01 | 4.3043E−01 | 7.8179E−02 | 2.1229E−01 | 4.7441E−02 | −1.4650E−01 |
| A6 = | −9.6174E−02 | 1.8588E−02 | −2.1677E−01 | 1.1627E−01 | 2.7959E−01 | 5.1975E−02 |
| A8 = | 7.2920E−02 | −7.9239E−01 | −5.2138E−01 | −1.4475E+00 | −3.3022E−01 | 9.1738E−02 |
| A10 = | −3.7760E−02 | 2.7926E+00 | −2.0602E−01 | 2.1573E+00 | 1.2461E−01 | −2.5074E−01 |
| A12 = | 1.2407E−02 | −2.5621E+00 |  | −1.3624E+00 | 2.3031E−02 | 2.2217E−01 |
| A14 = | −1.8895E−03 |  |  |  |  |  |

TABLE 16-continued

Aspheric Coefficients

| Surface # | | | | | |
|---|---|---|---|---|---|
| 8 | 9 | 10 | 11 | 12 | 13 |
| k = −8.6851E+00 | −5.0667E−01 | −2.9673E+00 | −1.8174E+00 | −2.3954E+01 | −1.2700E+00 |
| A4 = −4.2194E−02 | 4.1136E−01 | 2.1689E−01 | 3.7993E−02 | 2.7413E−02 | −2.8479E−01 |
| A6 = 9.7518E−02 | −5.6652E−01 | −3.3425E−01 | 9.5318E−02 | −5.4917E−01 | 1.0662E−01 |
| A8 = −1.1156E−01 | 4.2302E−01 | 2.6614E−01 | −5.9917E−02 | 6.2523E−01 | −1.5683E−02 |
| A10 = 6.1521E−02 | −1.6318E−01 | −1.5220E−01 | 4.5946E−03 | −3.9032E−01 | −4.5451E−03 |
| A12 = −1.2532E−02 | 2.9870E−02 | 5.9676E−02 | 1.0187E−02 | 1.3884E−01 | 2.2536E−03 |
| A14 = | | −1.0313E−02 | −4.5490E−03 | −2.5491E−02 | −3.5017E−04 |
| A16 = | | | 6.0313E−04 | 1.8654E−03 | 1.9665E−05 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.27 | T56/T12 | 2.21 |
| Fno | 2.40 | T56/(CT5 + CT6) | 1.46 |
| HFOV [deg.] | 55.0 | Y62/f | 0.99 |
| (V1 + V3 + V4)/(V2 + V5 + V6) | 2.40 | |f/R3| + |f/R4| | 0.07 |
| CT1/CT3 | 1.04 | |f1/f2| | 0.104 |
| CT2/CT1 | 0.31 | |f5/f2| | 0.054 |
| (T12 + T56)/(T23 + T34 + T45) | 6.77 | |f/f3| + |f/f4| | 1.94 |

Moreover, in the imaging lens system according to the 8th embodiment, when the focal length of the first lens element 810 is f1, the focal length of the second lens element 820 is f2, the focal length of the third lens element 830 is f3, the focal length of the fourth lens element 840 is f4, the focal length of the fifth lens element 850 is f5, and the focal length of the sixth lens element 860 is f6, and |f4| is a minimum value among values of |f1|, |f2|, |f3|, |f4|, |f5| and |f6|.

9th Embodiment

Figure 17:
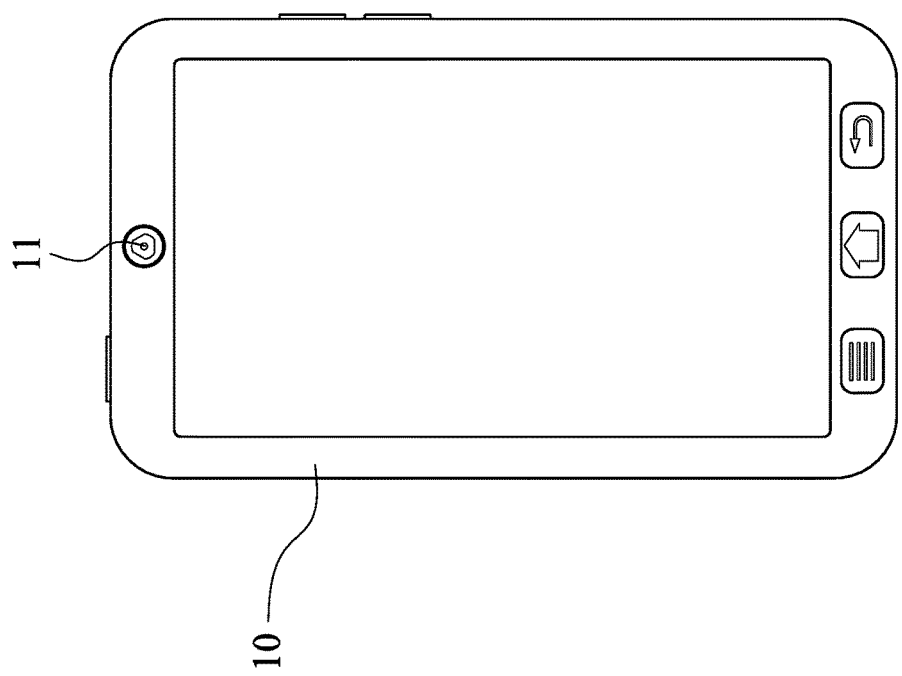
FIG. 17 is a schematic view of an electronic device according to the 9th embodiment of the present disclosure.

FIG. 17 is a schematic view of an electronic device 10 according to the 9th embodiment of the present disclosure. The electronic device 10 of the 9th embodiment is a smartphone, wherein the electronic device 10 includes an image capturing device 11. The image capturing device 11 includes an imaging lens system (its reference numeral is omitted) according to the present disclosure and an image sensor (its reference numeral is omitted), wherein the image sensor is disposed on an image surface of the imaging lens system.

10th Embodiment

Figure 18:
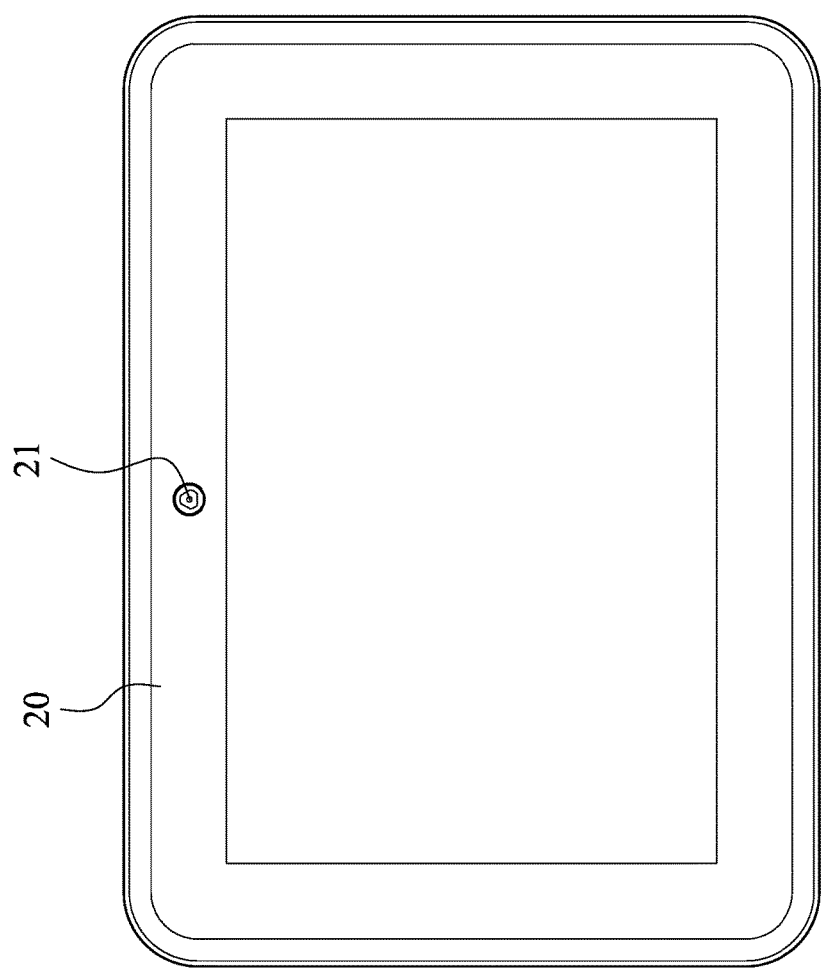
FIG. 18 is a schematic view of an electronic device according to the 10th embodiment of the present disclosure.

FIG. 18 is a schematic view of an electronic device 20 according to the 10th embodiment of the present disclosure. The electronic device 20 of the 10th embodiment is a tablet personal computer, wherein the electronic device 20 includes an image capturing device 21. The image capturing device 21 includes an imaging lens system (its reference numeral is omitted) according to the present disclosure and an image sensor (its reference numeral is omitted), wherein the image sensor is disposed on an image surface of the imaging lens system.

11th Embodiment

Figure 19:
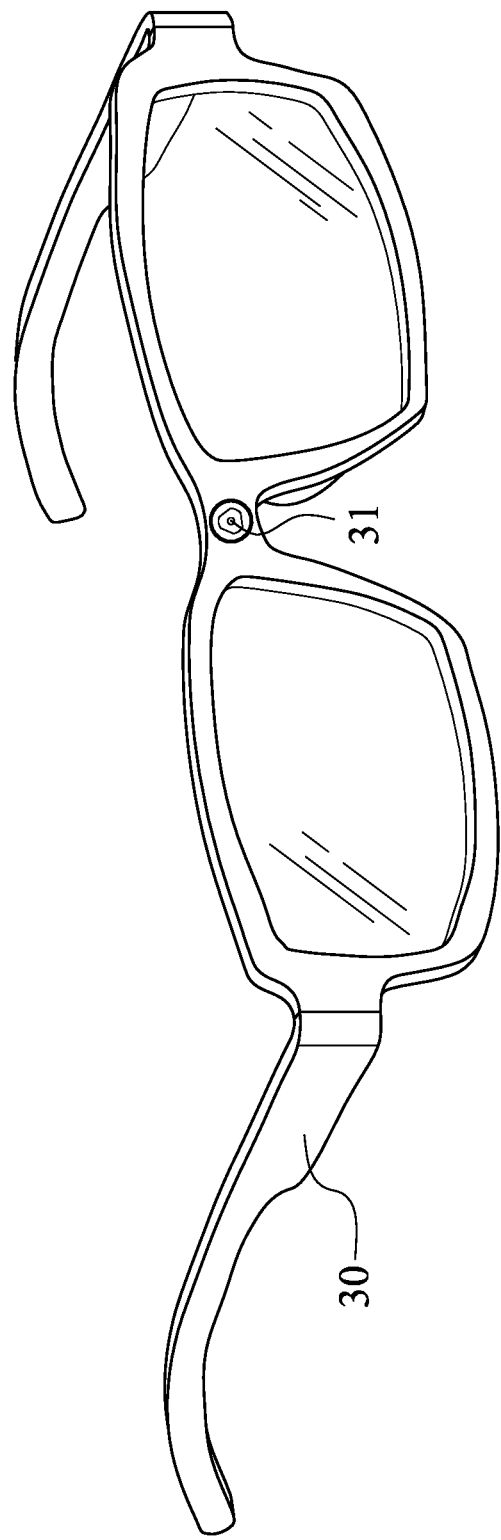
FIG. 19 is a schematic view of an electronic device according to the 11th embodiment of the present disclosure.

FIG. 19 is a schematic view of an electronic device 30 according to the 11th embodiment of the present disclosure. The electronic device 30 of the 11th embodiment is a wearable device, wherein the electronic device 30 includes an image capturing device 31. The image capturing device 31 includes an imaging lens system (its reference numeral is omitted) according to the present disclosure and an image sensor (its reference numeral is omitted), wherein the image sensor is disposed on an image surface of the imaging lens system.

The foregoing description, for purpose of explanation, has been described with reference to specific embodiments. It is to be noted that Tables 1-16 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens system comprising, in order from an object side to an image side:
 a first lens element having negative refractive power, wherein the first lens element has an object-side surface being concave in a paraxial region thereof and comprising at least one convex shape in an off-axial region thereof;
 a second lens element;
 a third lens element;
 a fourth lens element with positive refractive power having an object-side surface and an image-side surface being both aspheric;
 a fifth lens element with negative refractive power having an object-side surface being concave in a paraxial region thereof and an image-side surface being convex in a paraxial region thereof; and
 a sixth lens element having an image-side surface being concave in a paraxial region thereof and comprising at least one convex shape in an off-axial region thereof;

wherein the imaging lens system has a total of six lens elements, at least three of the six lens elements are made of plastic materials, there is an air space between every two lens elements of the first lens element, the second lens element, the third lens element, the fourth lens element, the fifth lens element and the sixth lens element that are adjacent to each other, an axial distance between the first lens element and the second lens element is T12, an axial distance between the fifth lens element and the sixth lens element is T56, a focal length of the first lens element is f1, a focal length of the second lens element is f2, a focal length of the fifth lens element is f5, and the following conditions are satisfied:

1.10<T56/T12;

|f1/f2|<2.0; and

|f5/f2|<1.50.

2. The imaging lens system of claim 1, wherein the axial distance between the first lens element and the second lens element is T12, the axial distance between the fifth lens element and the sixth lens element is T56, and the following condition is satisfied:

1.25<T56/T12<4.0.

3. The imaging lens system of claim 2, wherein the axial distance between the first lens element and the second lens element is T12, the axial distance between the fifth lens element and the sixth lens element is T56, and the following condition is satisfied:

1.40<T56/T12<3.0.

4. The imaging lens system of claim 2, wherein the focal length of the first lens element is f1, the focal length of the second lens element is f2, and the following condition is satisfied:

|f1/f2|<1.0.

5. The imaging lens system of claim 1, wherein the first lens element has an image-side surface being concave in a paraxial region thereof.

6. The imaging lens system of claim 5, wherein the third lens element has positive refractive power.

7. The imaging lens system of claim 5, further comprising:
an aperture stop disposed between the first lens element and the third lens element, wherein an f-number of the imaging lens system is Fno, and the following condition is satisfied:

1.6<Fno≤2.65.

8. The imaging lens system of claim 1, wherein the image-side surface of the fifth lens element comprises at least one concave shape in an off-axial region thereof.

9. The imaging lens system of claim 1, wherein the focal length of the first lens element is f1, the focal length of the second lens element is f2, a focal length of the third lens element is f3, a focal length of the fourth lens element is f4, the focal length of the fifth lens element is f5, a focal length of the sixth lens element is f6, and |f4| is a minimum value among values of |f1|, |f2|, |f3|, |f4|, |f5| and |f6|.

10. The imaging lens system of claim 1, wherein a focal length of the imaging lens system is f, a focal length of the third lens element is f3, a focal length of the fourth lens element is f4, and the following condition is satisfied:

1.5<|f/f3|+|f/f4|<3.0.

11. The imaging lens system of claim 1, wherein the sixth lens element has negative refractive power.

12. The imaging lens system of claim 1, wherein a central thickness of the fifth lens element is CT5, a central thickness of the sixth lens element is CT6, the axial distance between the fifth lens element and the sixth lens element is T56, and the following condition is satisfied:

0.85<T56/(CT5+CT6)<2.0.

13. The imaging lens system of claim 1, wherein the axial distance between the first lens element and the second lens element is T12, an axial distance between the second lens element and the third lens element is T23, an axial distance between the third lens element and the fourth lens element is T34, an axial distance between the fourth lens element and the fifth lens element is T45, the axial distance between the fifth lens element and the sixth lens element is T56, and the following condition is satisfied:

2.5<(T12+T56)/(T23+T34+T45)<25.

14. The imaging lens system of claim 1, wherein an Abbe number of the first lens element is V1, an Abbe number of the second lens element is V2, an Abbe number of the third lens element is V3, an Abbe number of the fourth lens element is V4, an Abbe number of the fifth lens element is V5, an Abbe number of the sixth lens element is V6, and the following condition is satisfied:

1.90<(V1+V3+V4)/(V2+V5+V6)<3.5.

15. The imaging lens system of claim 1, wherein a central thickness of the first lens element is CT1, a central thickness of the third lens element is CT3, and the following condition is satisfied:

0.70<CT1/CT3<1.5.

16. The imaging lens system of claim 1, wherein a central thickness of the first lens element is CT1, a central thickness of the second lens element is CT2, and the following condition is satisfied:

0.10<CT2/CT1<0.70.

17. The imaging lens system of claim 1, wherein a focal length of the imaging lens system is f, a curvature radius of an object-side surface of the second lens element is R3, a curvature radius of an image-side surface of the second lens element is R4, and the following condition is satisfied:

|f/R3|+|f/R4|<1.0.

18. The imaging lens system of claim 1, wherein a focal length of the imaging lens system is f, a maximal effective radius of the image-side surface of the sixth lens element is Y62, and the following condition is satisfied:

0.90<Y62/f<1.30.

19. The imaging lens system of claim 1, wherein the sixth lens element has an object-side surface being convex in a paraxial region thereof.

20. An image capturing device, comprising:
the imaging lens system of claim 1; and
an image sensor, wherein the image sensor is disposed on an image surface of the imaging lens system.

21. An electronic device, comprising:
the image capturing device of claim 20.

* * * * *